US012521695B2

(12) United States Patent
Kwak et al.

(10) Patent No.: US 12,521,695 B2
(45) Date of Patent: *Jan. 13, 2026

(54) SUPER ABSORBENT POLYMER

(71) Applicant: LG Chem, Ltd., Seoul (KR)

(72) Inventors: Soo Young Kwak, Daejeon (KR);
Kwang In Shin, Daejeon (KR); Kyung Su Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/051,675

(22) Filed: Feb. 12, 2025

(65) Prior Publication Data
US 2025/0339841 A1 Nov. 6, 2025

(30) Foreign Application Priority Data
May 2, 2024 (KR) .......................... 10-2024-0058656

(51) Int. Cl.
*B01J 20/26* (2006.01)
*B01J 20/28* (2006.01)
*C08F 220/06* (2006.01)

(52) U.S. Cl.
CPC ....... *B01J 20/261* (2013.01); *B01J 20/28016* (2013.01); *C08F 220/06* (2013.01)

(58) Field of Classification Search
CPC .............................. C08F 220/06; B01J 20/261
See application file for complete search history.

(56) References Cited

U.S. PATENT DOCUMENTS

| 6,319,558 | B1 | 11/2001 | Willemsen |
| 10,994,260 | B2 | 5/2021 | Kovacic et al. |
| 2005/0003191 | A1 | 1/2005 | Ehrnsperger et al. |
| 2005/0239942 | A1 | 10/2005 | Herfert et al. |

(Continued)

FOREIGN PATENT DOCUMENTS

| CN | 001136355 C | 1/2004 |
| EP | 3270857 B1 | 12/2019 |

(Continued)

OTHER PUBLICATIONS

Machine-generated English-language translation of KR10-2022-0169431A.*

(Continued)

*Primary Examiner* — Vu A Nguyen
(74) *Attorney, Agent, or Firm* — Lerner David LLP

(57) ABSTRACT

A polyacrylic acid (salt)-based super absorbent polymer has a T2 relaxation time of $1.85 \times 10^{-5}$ seconds or less, as derived by exponential fitting of the TD-NMR measurement results of the super absorbent polymer through regression analysis using the following Equation 1:

$$y = y0 + A \times e^{-\left(\frac{x}{t}\right)}$$

wherein, y represents a signal intensity obtained through TD-NMR analysis, x represents an echo time determined from specified experimental parameters: first duration; last duration; and a data point, t represents a T2 relaxation time derived by exponential fitting, A represents a signal intensity value derived by exponential fitting, and y0 represents an offset constant derived through regression analysis.

11 Claims, 4 Drawing Sheets

(56) References Cited

U.S. PATENT DOCUMENTS

| | | |
|---|---|---|
| 2006/0020053 A1 | 1/2006 | Flohr et al. |
| 2007/0264489 A1 | 11/2007 | Sasabe et al. |
| 2008/0021150 A1 | 1/2008 | Becker et al. |
| 2008/0075937 A1 | 3/2008 | Wada et al. |
| 2008/0140037 A1 | 6/2008 | Newman |
| 2012/0220452 A1 | 8/2012 | Matsumoto et al. |
| 2013/0026412 A1 | 1/2013 | Machida et al. |
| 2013/0102750 A1 | 4/2013 | Watanabe et al. |
| 2013/0136713 A1 | 5/2013 | Terada et al. |
| 2013/0175473 A1 | 7/2013 | Wada et al. |
| 2014/0031203 A1 | 1/2014 | Kondo et al. |
| 2014/0031473 A1 | 1/2014 | Nogi et al. |
| 2015/0299404 A1 | 10/2015 | Daniel et al. |
| 2015/0307681 A1 | 10/2015 | Park et al. |
| 2016/0208035 A1 | 7/2016 | Ryu et al. |
| 2017/0014801 A1 | 1/2017 | Ikeuchi et al. |
| 2017/0073478 A1 | 3/2017 | Joo et al. |
| 2017/0189575 A1 | 7/2017 | Lee et al. |
| 2017/0216817 A1 | 8/2017 | Torii et al. |
| 2017/0233534 A1 | 8/2017 | Kim et al. |
| 2017/0312148 A1 | 11/2017 | Dobrosielska-Oura et al. |
| 2018/0021437 A1 | 1/2018 | Kim et al. |
| 2018/0037686 A1 | 2/2018 | Lee et al. |
| 2018/0243464 A1 | 8/2018 | Hwang et al. |
| 2019/0099739 A1 | 4/2019 | Lee et al. |
| 2019/0344243 A1 | 11/2019 | Lee et al. |
| 2020/0085716 A1 | 3/2020 | Mehling et al. |
| 2020/0139344 A1 | 5/2020 | Kim et al. |
| 2021/0033516 A1 | 2/2021 | Toennessen et al. |
| 2021/0040271 A1 | 2/2021 | Lee et al. |
| 2021/0100684 A1 | 4/2021 | Kitabata et al. |
| 2021/0113989 A1 | 4/2021 | Hur et al. |
| 2021/0121852 A1 | 4/2021 | Herfert et al. |
| 2021/0154637 A1 | 5/2021 | Pfeiffer et al. |
| 2021/0244844 A1 | 8/2021 | Chan et al. |
| 2021/0362126 A1 | 11/2021 | Bauer et al. |
| 2022/0088568 A1 | 3/2022 | Kimura et al. |
| 2023/0102961 A1 | 3/2023 | Nishimura et al. |
| 2023/0338925 A1 | 10/2023 | Chung et al. |
| 2023/0381744 A1 | 11/2023 | Woo et al. |
| 2024/0278211 A1 | 8/2024 | Han et al. |

FOREIGN PATENT DOCUMENTS

| | | | |
|---|---|---|---|
| EP | 4137534 | A1 | 2/2023 |
| EP | 4206244 | A1 | 7/2023 |
| EP | 4253451 | A1 | 10/2023 |
| EP | 4321559 | A1 | 2/2024 |
| JP | h8122284 | A | 5/1996 |
| JP | 2001106728 | A | 4/2001 |
| JP | 2002504568 | A | 2/2002 |
| JP | 2005097569 | A | 4/2005 |
| JP | 3745539 | B2 | 2/2006 |
| JP | 2006527641 | A | 12/2006 |
| JP | 2007512405 | A | 5/2007 |
| JP | 2009057496 | A | 3/2009 |
| JP | 4261853 | B2 | 4/2009 |
| JP | 4284767 | B2 | 6/2009 |
| JP | 4908545 | B2 | 4/2012 |
| JP | 2012097273 | A | 5/2012 |
| JP | WO2012144564 | A1 | 7/2014 |
| JP | 5616437 | B2 | 10/2014 |
| JP | 5692844 | B2 | 4/2015 |
| JP | 2015120933 | A | 7/2015 |
| JP | 5913423 | B2 | 4/2016 |
| JP | 2017185485 | A | 10/2017 |
| JP | 2017531531 | A | 10/2017 |
| JP | 2018510041 | A | 4/2018 |
| JP | 2021510320 | A | 4/2021 |
| JP | 6890190 | B2 | 6/2021 |
| JP | 6950158 | B2 | 10/2021 |
| JP | 6959030 | B2 | 11/2021 |
| JP | 7181948 | B2 | 12/2022 |
| JP | 7270828 | B2 | 5/2023 |
| JP | 7362653 | B2 | 10/2023 |
| KR | 100317398 | B1 | 11/2002 |
| KR | 20050036974 | A | 4/2005 |
| KR | 20070039050 | A | 4/2007 |
| KR | 20070048226 | A | 5/2007 |
| KR | 20070083761 | A | 8/2007 |
| KR | 20130097771 | A | 9/2013 |
| KR | 20140063116 | A | 5/2014 |
| KR | 20150062959 | A | 6/2015 |
| KR | 20150087368 | A | 7/2015 |
| KR | 20150142636 | A | 12/2015 |
| KR | 20150143181 | A | 12/2015 |
| KR | 20160127742 | A | 11/2016 |
| KR | 101700354 | B1 | 1/2017 |
| KR | 20170020113 | A | 2/2017 |
| KR | 20170033634 | A | 3/2017 |
| KR | 20170063818 | A | 6/2017 |
| KR | 20170111295 | A | 10/2017 |
| KR | 101812895 | B1 | 12/2017 |
| KR | 101848470 | B1 | 4/2018 |
| KR | 20180073334 | A | 7/2018 |
| KR | 20180074384 | A | 7/2018 |
| KR | 101908142 | B1 | 10/2018 |
| KR | 101918647 | B1 | 11/2018 |
| KR | 20190012809 | A | 2/2019 |
| KR | 20190016534 | A | 2/2019 |
| KR | 101989142 | B1 | 6/2019 |
| KR | 20190072406 | A | 6/2019 |
| KR | 102094453 | B1 | 3/2020 |
| KR | 20200051565 | A | 5/2020 |
| KR | 20200062012 | A | 6/2020 |
| KR | 20200073044 | A | 6/2020 |
| KR | 20200123127 | A | 10/2020 |
| KR | 102322774 | B1 | 11/2021 |
| KR | 20220046497 | A | 4/2022 |
| KR | 20220049961 | A | 4/2022 |
| KR | 20220068184 | A | 5/2022 |
| KR | 20220088351 | A | 6/2022 ................ C08J 3/12 |
| KR | 10-2022-0169431 | A * | 12/2022 |
| KR | 20220169431 | A | 12/2022 |
| KR | 20220169437 | A | 12/2022 |
| KR | 20220169444 | A | 12/2022 |
| KR | 102568226 | B1 | 8/2023 |
| KR | 20230120110 | A | 8/2023 |
| KR | 102578740 | B1 | 9/2023 |
| KR | 102584470 | B1 | 10/2023 |
| KR | 20240014710 | A | 2/2024 |
| WO | 2022265459 | A1 | 12/2022 |
| WO | 2022265466 | A1 | 12/2022 |
| WO | 2022265472 | A1 | 12/2022 |
| WO | 2022265477 | A1 | 12/2022 |

OTHER PUBLICATIONS

International Search Report for Application No. PCT/KR2024/018688 mailed Mar. 7, 25. 5 p. (see p. 2-4, categorizing the cited references).

International Search Report for Application No. PCT/KR2024/018689 mailed Mar. 7, 25. 5 pages (see p. 2-4, categorizing the cited references).

Shi, Mingsheng, et al., "The Development of a Polysaccharide-Based Hydrogel Encapsulating Tobramycin- Loaded Gelatine Microspheres as an Antibacterial System", Gels 2023, Mar. 2023, 15 Pages, vol. 9(3), No. 219.

Zhang, Shuxin, et al., "Predicting the Swelling Behavior of Acrylic Superabsorbent Polymers Used in Diapers", Advances in Polymer Technology, Dec. 2021, 7 pages, vol. 2021.

George Odian, "Principles of Polymerization", Wiley-Interscience, Feb. 2004. 839 pages.

International Search Report for Application No. PCT/KR2025/002375 mailed Jun. 2, 2025. 3 pages.

International Search Report for Application No. PCT/KR2025/002377 mailed May 26, 2025. 3 pages.

Kim, S., et al. Preparation of Surface-Reinforced Superabsorbent Polymer Hydrogel Microspheres via Incorporation of In Situ Synthesized Silver Nanoparticles. Polymers. Mar. 2021; 13(6):902. https://doi.org/10.3390/polym13060902.11 pgs.

(56) References Cited

OTHER PUBLICATIONS

International Search Report for Application No. PCT/KR2025/095022 mailed Jul. 4, 2025. 3 pages.
Menceloglu, Y., et al., "Triblock Superabsorbent Polymer Nanocomposites with Enhanced Water Retention Capacities and Rheological Characteristics", ACS Omega, vol. 7, Issue 24, pp. 20486-20494, Jun. 8, 2022.
Kim, Hae Chan, "Superabsorbent polymer with enhanced gel strength and heat resistance using itaconic acid-based oligomer", Polymers for Advanced Technologies, vol. 34, pp. 2564-2572, Apr. 25, 2023.
International Search Report for Application No. PCT/KR2025/005235 mailed Jul. 22, 2025. 5 pages.
International Search Report for Application No. PCT/KR2025/005233 mailed Jul. 28, 2025. 3 pages.
International Search Report for Application No. PCT/KR2025/006016 dated Aug. 1, 2025 . 7 pages.
International Search Report for Application No. PCT/KR2025/006021 dated Jul. 31, 2025 . 7 pages.
International Search Report for Application No. PCT/KR2025/095303 dated Aug. 4, 2025 . 4 pages.
Situ, Y, et al., "Synthesis and application of super absorbent polymers synthesized with ammonia solution and diatomaceous earth with low toxic residues" Environmental Technology & Innovation, Oct. 2023, pp. 1-12, vol. 32.
Kwon, Y.R. "Surface-crosslinking of itaconic acid-based superabsorbent polymer using a novel bio-based surface-crosslinker based on succinic acid" Polymer-Plastics Technology and Materials, Taylor & Francis, Mar. 2023, pp. 1057-1066, vol. 62, Issue 8.
Sharma, S. et al., "Superabsorbent Polymer Gels based on Polyaspartic Acid and Polyacrylic Acid" Journal of Material Science & Engineering, Feb. 2016, pp. 1-7, vol. 5, Issue 3.
International Search Report for Application No. PCT/KR2025/006678 mailed Aug. 29, 2025, 11 pages.
International Search Report for Application No. PCT/KR2025/006025 mailed Aug. 6, 2025, 13 pages.
International Search Report for Application No. PCT/KR2025/006542 mailed Aug. 27, 2025, 9 pages.
International Search Report for Application No. PCT/KR2025/006675 mailed Aug. 27, 2025, 9 pages.

\* cited by examiner

[FIG. 1]

[FIG. 2]

```
Illumination Settings
  Light source
      ● Diascopic (bottom light)              ☐ Light calibration over sample
      ○ Episcopic (top light)                 (Recommended for non-transparent substrates)
          ○ Bright field
          ● Dark field (Manual light control only)
          ☐ Polariser/ DIC Light options
      ● Automatic light calibration
          Calibration intensity : 70.00
          Intensity tolerance : 0.20

○ Manual light control (Advanced)
```

[FIG. 3]
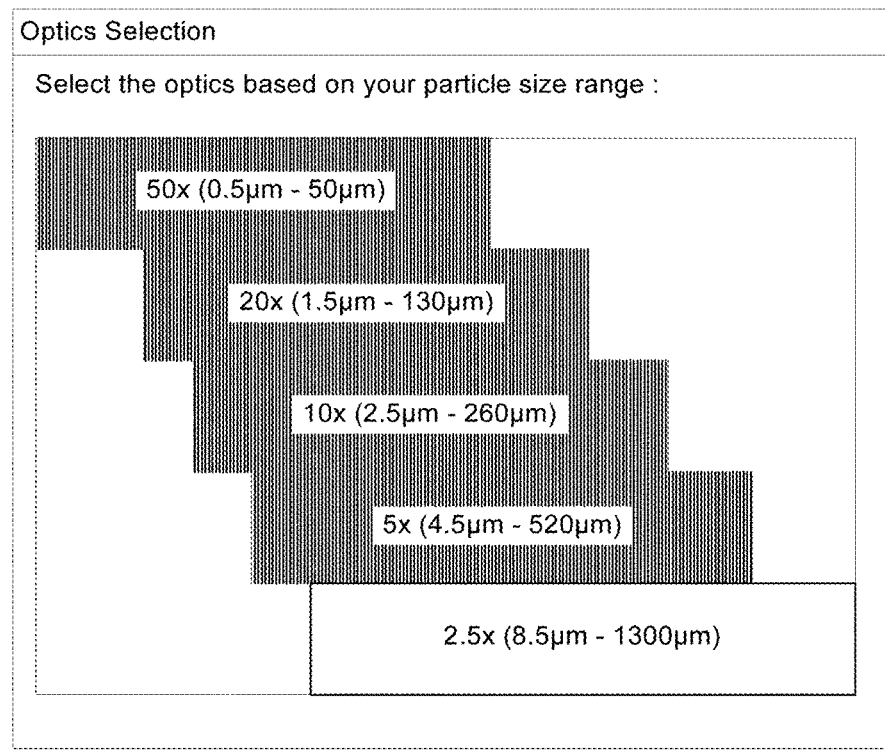

[FIG. 4]
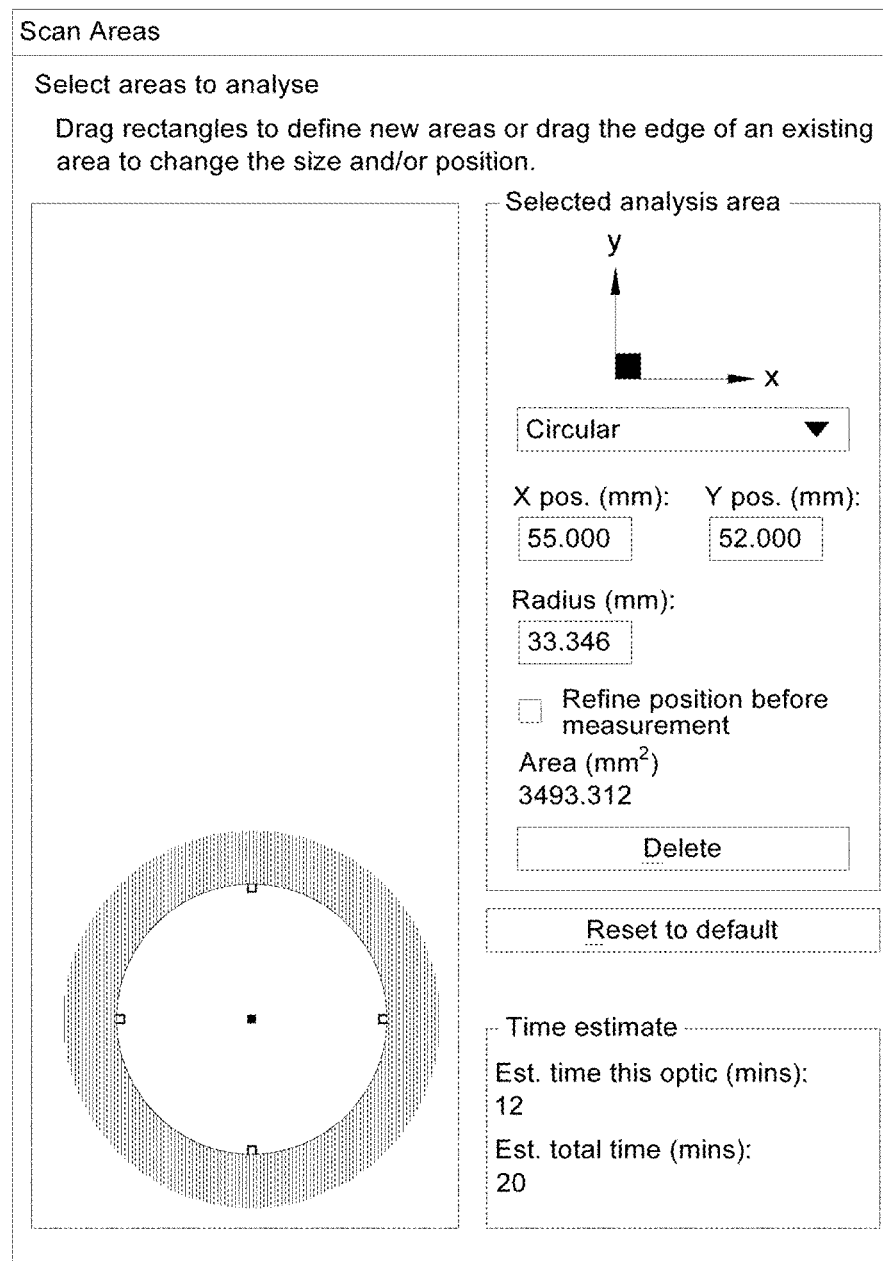

SUPER ABSORBENT POLYMER

CROSS-REFERENCE TO RELATED APPLICATION

This application claims priority to Korean Patent Application No. 10-2024-0058656, filed on May 2, 2024, the disclosure of which is incorporated herein by reference in its entirety.

BACKGROUND

The present disclosure relates to a super absorbent polymer exhibiting an improved absorption rate and improved absorption performance.

A super absorbent polymer (SAP) is a synthetic polymer material that can absorb 500 to 1,000 times its own weight in moisture, and is given different names, such as super absorbent material (SAM), absorbent gel material (AGM), and the like, in the industry. The super absorbent polymers described above was first put into practical use as sanitary products, and are now widely used as soil water retainers for horticulture, water-retaining materials for civil engineering and construction, sheets for raising seedlings, and freshness-preserving agents and materials for steaming in the food distribution industry.

The super absorbent polymer has a crosslinked structure within the polymer, which greatly affects its physical properties. The crosslinked structure is formed through chemical crosslinking and physical crosslinking. That is, although super absorbent polymers have chemical crosslinking parts, they also have physical crosslinking, such as chain entanglement, dangling chains, and interpenetrating networks, in which the polymer chains are physically entangled.

Among these, chemical crosslinking can determine the degree of crosslinking reaction of a super absorbent polymer, and determining the degree of chemical crosslinking is necessary for understanding the initial properties of a super absorbent polymer.

In particular, since super absorbent polymers are widely used in the field of sanitary products such as diapers and sanitary pads, they need to exhibit not only high absorption performance but also a fast absorption rate. That is, the initial properties of a super absorbent polymer are important properties in the relevant field.

In addition, the development of so-called pulpless products, in which the pulp content is reduced or even no pulp is used at all, is being actively pursued in order to provide thinner products.

As a result, the product includes a relatively high proportion of a super absorbent polymer, and super absorbent polymer particles are inevitably included in multiple layers within the product. In addition, in order for the super absorbent polymer to absorb a large amount of liquid such as water, saline, or urine, the absorption properties need to be improved so that it has not only high absorption performance but also a fast absorption rate.

To this end, a method is commonly used in which a monomer composition is subjected to crosslinking polymerization together with a foaming agent to form a porous structure within the base resin powder, thereby increasing the surface area of the super absorbent polymer.

However, a problem occurred in which various properties of the super absorbent polymer, such as surface tension, liquid permeability, or bulk density, were reduced due to the use of the foaming agent. That is, a problem occurred in which it was difficult to maintain the shape in a swollen state. In addition, it had the disadvantage of increasing the amount of fine particles.

Conversely, when the crosslinking density of the super absorbent polymer is controlled to be high in order to improve the liquid permeability of the super absorbent polymer, there is a problem in that the centrifuge retention capacity, which is a basic property of the super absorbent polymer, is reduced because it is difficult to absorb moisture between the dense crosslinked structures.

Accordingly, there is a continuous demand for the development of a super absorbent polymer to improve the initial properties of a super absorbent polymer and fundamentally solve problems such as liquid permeability.

SUMMARY

The present disclosure relates to a super absorbent polymer exhibiting an improved absorption rate and improved absorption performance.

The present disclosure is directed to providing a super absorbent polymer (SAP) having excellent physical and chemical crosslinking and excellent property balance by controlling the T2 relaxation time of a super absorbent polymer to be within a certain range. In particular, the present disclosure is directed to providing a super absorbent polymer having an excellent absorbency under pressure and liquid permeability.

The present disclosure relates to a polyacrylic acid (salt)-based super absorbent polymer, and provides a super absorbent polymer having a T2 relaxation time of $1.85 \times 10^{-5}$ seconds or less, as derived by exponential fitting of the TD-NMR measurement results of the super absorbent polymer through regression analysis using the following Equation 1.

$$y = y0 + A \times e^{-\left(\frac{x}{t}\right)} \qquad \text{[Equation 1]}$$

In Equation 1, y represents a signal intensity obtained through TD-NMR analysis, x represents an echo time determined from specified experimental parameters: first duration; last duration; and a data point, t represents a T2 relaxation time derived by exponential fitting, A represents a signal intensity value derived by exponential fitting, and y0 represents an offset constant derived through regression analysis.

BRIEF DESCRIPTION OF THE DRAWINGS

The above and other objects, features and advantages of the present disclosure will become more apparent to those of ordinary skill in the art by describing exemplary aspects thereof in detail with reference to the accompanying drawings, in which:

FIG. 1 shows the setting values of a sample dispersion unit in Morphologi 4 from Malvern Panalytical;

FIG. 2 shows the illumination setting values in Morphologi 4 from Malvern Panalytical;

FIG. 3 shows the optics selection setting values in Morphologi 4 from Malvern Panalytical; and FIG. 4 shows the scan area setting values in Morphologi 4 from Malvern Panalytical.

DETAILED DESCRIPTION

Unless otherwise defined herein, all technical and scientific terms used herein are used for the purpose of describing exemplary aspects only and are not intended to be limiting of the disclosure. Singular expressions include plural expressions unless the context clearly dictates otherwise. In this specification, the terms "comprises," "includes," or "has" and the like are intended to designate the presence of the features, numbers, steps, components, or combinations thereof that are implemented, and are not to be understood as precluding the possibility of the presence or addition of one or more other features or numbers, steps, components or combinations thereof.

While the disclosure is susceptible to various modifications and forms, specific aspects thereof will be exemplified and described in detail below. However, this is not intended to limit the present disclosure to specific aspects, and it should be understood to include all modifications, equivalents and substitutes included in the spirit and scope of the present disclosure.

The terminology used herein is for the purpose of describing particular aspects only and is not intended to limit the disclosure. Also, the singular forms used here include the plural forms unless the phrases clearly indicate a contrary meaning.

The term "polymer" or "high molecular weight molecule" as used here refers to a state in which a water-soluble ethylenically unsaturated monomer is polymerized, and can encompass any moisture content range or particle diameter range.

In addition, the term "super absorbent polymer" is used to mean, depending on the context, a base resin in powder form consisting of a crosslinked polymer or super absorbent polymer particles obtained by pulverizing the crosslinked polymer, or to encompass all products made suitable for commercialization by subjecting the crosslinked polymer or the base resin to additional processes such as drying, pulverizing, classifying, and surface crosslinking.

In addition, the term "chopping" refers to cutting a hydrogel polymer into small pieces in millimeter units to increase drying efficiency and is used to differentiate from pulverizing to a micrometer or normal particle size.

In addition, the term "micronizing" or "micronization" refers to pulverizing a hydrogel polymer into particle sizes of tens to hundreds of micrometers and is used to differentiate it from "chopping".

In this specification, the element symbols used are those described in the periodic table.

Hereinafter, a super absorbent polymer and a method of preparing the same according to specific aspects of the disclosure will be described in more detail.

I. Polyacrylic Acid (Salt)-Based Super Absorbent Polymer

A super absorbent polymer of the present disclosure is a polyacrylic acid (salt)-based super absorbent polymer, and is characterized in that a T2 relaxation time is $1.85 \times 10^{-5}$ seconds or less, as derived by exponential fitting of the TD-NMR measurement results of the super absorbent polymer through regression analysis using Equation 1.

At this time, the method for obtaining the T2 relaxation time derived by exponential fitting of the TD-NMR measurement results of the super absorbent polymer through regression analysis using Equation 1 is as follows.

Step 1) Drying (Pretreatment) of Super Absorbent Polymer
 The super absorbent polymer is dried at about 100° C. for about 12 hours.

Step 2) Sealing (Sampling) of Dried Super Absorbent Polymer
  1. About 50 mg of the dried super absorbent polymer is input to a 10 mm NMR tube.
  2. The tube is sealed with Parafilm and sampled for TD-NMR analysis.

Step 3) TD-NMR Analysis
  1. The tube, which contains the super absorbent polymer and is sealed and sampled, is stabilized at approximately 40° C. for approximately 1 hour.
  2. After stabilization, TD-NMR analysis is performed under the following measurement conditions to derive the analysis results in which the x-axis represents echo time and the y-axis represents signal intensity, and the signal intensity is measured.

At this time, the TD-NMR analysis equipment including the NMR tube may be the minispec mq20 from Bruker, but is not limited thereto, and equipment commonly used in the relevant field may be used.

<Measurement Conditions>
 1) Temperature: 40° C.
 2) Nuclide: $^1$H
 3) Method: Hahn spin-Echo
 4) Delay time: 30 sec
 5) Number of scans: 4
 6) Receiver gain: Use automatic values measured by the device for each sample
 7) First pulse duration: 0.01 ms
 8) Final pulse duration: 0.15 ms
 9) Number of data points for fitting: 20
 10) Time for decay curve display: 3 sec Step 4) Exponential Fitting
 The analysis results measured in step 3 refer to the signal intensity that appears as a result of observing free induction decay (FID), which appears as the decay of the 1H signal through TD-NMR analysis. The signal strength is observed according to the echo time.

Using the signal intensity and echo time, which are the experimental parameters of the analysis results, t is derived by exponential fitting through regression analysis using the following Equation 1. At this time, the derived t corresponds to the T2 relaxation time. This process is defined as obtaining the T2 relaxation time by exponential fitting.

$$y = y0 + A \times e^{-(\frac{x}{t})} \qquad \text{[Equation 1]}$$

In Equation 1,
y represents a signal intensity obtained through TD-NMR analysis,
x represents an echo time determined from specified experimental parameters: first duration; last duration; and a data point,
t represents a T2 relaxation time derived by exponential fitting,
A represents a signal intensity value derived by exponential fitting, and
y0 represents an offset constant derived through regression analysis.

At this time, the first duration refers to the shortest time interval (or duration) among the 90° and 180° pulse intervals when performing a Hahn spin-Echo experiment using TD-NMR, and the last duration means the longest time interval (or duration) among the 90° and 180° pulse intervals.

In addition, data points refer to how many data points are obtained in total using the first duration as the first data point and the last duration as the last data point. That is, when how many data points is obtained in total using the first duration as the first data point and the last duration as the last data point is determined, accordingly, the range of 90° and 180° pulse intervals between data points is determined. At this time, data point values are automatically calculated.

The Hahn spin-echo experiment is an NMR experiment that uses two radio frequency (RF) pulses, the first 90° pulse and the second 180° pulse.

The first pulse tilts the spin system to the xy plane, after which dephasing begins as the spins deviate from the magnetization direction. The second 180° pulse reverses the spin direction, inducing rephasing, which produces an echo.

That is, the echo time is the time between the first 90° pulse and the echo where the spin signal becomes maximum again. In the Hahn spin-echo experiment, an echo occurs when the spin signal reassembles after a 180° pulse, so the echo time is defined as the interval between the first 90° pulse and the time when the echo occurs.

That is, the echo time is determined by the time between a 90° pulse and a 180° pulse, and the echo time is double this value. When expressed as a formula, this is equivalent to Equation A below.

$$\text{Echo time} = (\text{Time between 90° and 180° pulses} + (90° \text{ pulse length} * 3/2)) * 2 \quad \text{[Equation A]}$$

Specifically, Equation 1 is for obtaining t from the echo time x determined by the experimental conditions and the signal intensity y obtained through TD-NMR analysis. At this time, y0, A, and t in Equation 1 are values that change depending on the values of x and y.

More specifically, Equation 1 is an equation for exponential fitting, and Bruker TD-NMR minispec mq20 and/or Origin s/w may be used to derive the t value, which is the T2 relaxation time, through regression analysis using Equation 1.

That is, in order to perform regression analysis, the T2 value may be obtained by applying the TD-NMR measurement results of the super absorbent polymer to Equation 1 using the basic s/w provided by Bruker TD-NMR minispec mq20, or the data may be fitted by applying the TD-NMR measurement results of the super absorbent polymer to Equation 1 using Origin s/w. Through this process, y0, A, and t may be derived, and the value of T2 may be obtained. This process is defined as regression analysis. There are also other available programs that may perform regression analysis.

y0, A, and t are derived by considering the error range.

In the present disclosure, the minimum value of t among the values considering the error range of t by reflecting conservative result interpretation, measurement reliability, and statistical perspectives, is defined as the T2 relaxation time.

In the process, the pretreatment of drying the super absorbent polymer at about 100° C. for about 12 hours is performed to measure the mobility of the super absorbent polymer without being affected by the moisture content. In TD-NMR analysis, the water component included in the super absorbent polymer is a material that greatly affects the result value. For example, the T1 relaxation time, which is one of the results derived from TD-NMR measurements, is affected by surrounding materials, and water is known to be a material that also takes along time for T2 relaxation. Therefore, the pretreatment process is performed to understand the inherent characteristics of the super absorbent polymer.

A super absorbent polymer (SAP) is prepared by crosslinking a polymer backbone consisting of carbon atoms to form a network structure and attaching water-loving ionic molecules to the network structure, or by polymerizing the ionic molecules themselves into the polymer backbone to form crosslinks. This process may be defined as chemical crosslinking.

In addition, the super absorbent polymer may have physical crosslinking, such as chain entanglement and dangling chains, in addition to chemical crosslinking. This physical crosslinking also affects the network structure of the super absorbent polymer. That is, chemical crosslinking and physical crosslinking affect the liquid permeability and absorption performance, such as centrifuge retention capacity and absorbency under pressure, of the super absorbent polymer.

At this time, a problem of a decrease in absorption performance may occur in the process of increasing the liquid permeability of the super absorbent polymer. That is, liquid permeability and absorption performance are in a trade-off relationship, and thus optimization of liquid permeability and absorption performance is necessary to provide an excellent super absorbent polymer.

Therefore, in order to optimize the liquid permeability and absorption performance, which are in a trade-off relationship, it is important to control physical crosslinking and chemical crosslinking within a certain range.

T2 relaxation, which may be confirmed in TD-NMR analysis, refers to the phenomenon in which spins within atoms dephase when the radio frequency is cut off after the spins within the atoms are transversely magnetized and in phase by applying radio frequency to a molecule. At this time, the signal measured when the radio frequency is cut off is called FID, and the size of the measured FID decreases over time. The size of transverse magnetization may be determined using the measured FID signal. At this time, the T2 relaxation time is the time taken for the size of the transverse magnetization to decrease to 37% of the maximum transverse magnetization size. Since the T2 relaxation time is not affected by the strength of the external magnetic field, it may be used to determine the inherent properties of the material.

The T2 relaxation time is a numerical value that may be used to determine how dense a molecule structure is, and may be measured using a time domain (TD)NMR device. The more structurally dense and rigid the molecule, the smaller (faster) the T2 relaxation time value is measured, and the less structurally dense and flexible the molecule, the larger (slower) the T2 relaxation time value is measured. This allows the relative rigidity of the molecules to be determined.

However, when performing TD-NMR analysis, not only the T2 relaxation due to the magnetic field inhomogeneity of the super absorbent polymer (material) itself, but also the T2 relaxation due to the external magnetic field inhomogeneity in the external environment of the super absorbent polymer (material) are reflected in the analysis. To distinguish T2 relaxation due to inhomogeneity of an external magnetic field from T2 relaxation due to magnetic field inhomogeneity, it is expressed as T2*relaxation.

Accordingly, the inventors of the present disclosure confirmed that the characteristics of only super absorbent polymers can be accurately determined while excluding the effects due to the inhomogeneity of the external magnetic field by adding an additional 180° phase radio frequency to compensate for the T2*relaxation effect. At the same time, the present inventors confirmed that a super absorbent polymer having an excellent liquid permeability and excellent absorption performance may be provided when the measured T2 relaxation time satisfies a specific numerical range as a result of exponential fitting.

That is, the degree of crosslinking of the super absorbent polymer may be indirectly predicted from the T2 relaxation time of the result of exponential fitting of the TD-NMR analysis results using the above-described method using Equation 1.

Specifically, the inventors of the present disclosure were able to obtain a super absorbent polymer having a T2 relaxation time of $1.85 \times 10^{-5}$ seconds (0.0185 ms) or less by controlling the preparation process conditions of the super absorbent polymer. For example, the super absorbent polymer of the present disclosure satisfies the T2 relaxation time of $1.85 \times 10^{-5}$ seconds or less after exponential fitting with Equation 1 by controlling process conditions, such as controlling the type or content of additives in the surface crosslinking process or controlling polymerization and pulverization process conditions.

The super absorbent polymer according to the present disclosure may have a T2 relaxation time of $1.85 \times 10^{-5}$ seconds or less, $1.84 \times 10^{-5}$ seconds or less, or $1.82 \times 10^{-5}$ seconds or less. In addition, the T2 relaxation time may be $1.60 \times 10^{-5}$ seconds or more, or $1.65 \times 10^{-5}$ seconds or more.

When the T2 relaxation time is $1.85 \times 10^{-5}$ seconds or less, the physical crosslinking and chemical crosslinking are dense, so that the physical properties such as liquid permeability are improved, and when the T2 relaxation time exceeds $1.85 \times 10^{-5}$ seconds, the physical crosslinking and chemical crosslinking are loose, so that the physical properties such as liquid permeability are poor.

Here, dense crosslinking means that there are relatively many crosslinks, and loose crosslinking means that there are relatively few crosslinks.

In one aspect of the present disclosure, the super absorbent polymer may have an average convexity value of 0.94 or less for all particles, as calculated using the following Equation 2.

$$M_c = L_s/L \quad \text{[Equation 2]}$$

In Equation 2, $M_c$ represents convexity, $L_s$ represents a length of an elastic band assuming that an image obtained by capturing, as a 2D image, a 3D image of the 3D particle to be measured is surrounded by an imaginary elastic band that stretches around the contour, and L represents an actual circumferential length of an image obtained by capturing, as a 2D image, a 3D image of the 3D particle to be measured.

The convexity is a parameter for measuring the particle outline and particle surface roughness with values from 0 to 1, and the closer the convexity is to 1, the more the particle may be considered to have a very smooth outline, and the closer the convexity is to 0, the more the particle may be considered to have a rough or uneven outline.

At this time, the average convexity value is measured after particles are randomly scattered over the stage by vacuum within the measuring device, and statistical results are derived by obtaining n of 200 or more and averaging them.

In one aspect of the present disclosure, the average value of the convexity of all particles of the super absorbent polymer may be 0.80 or more, 0.83 or more, 0.85 or more, 0.87 or more, and 0.94 or less, 0.93 or less, or 0.92 or less.

In one aspect of the present disclosure, the super absorbent polymer may have an average circle equivalent (CE) diameter of 220 μm to 400 μm.

The CE diameter refers to the diameter of a circle having the same area as an image obtained by capturing, as a 2D image, a 3D image of the particle, and the size of the particle may be expressed through the CE diameter. The average CE diameter value of the super absorbent polymer may be 220 μm or more, 230 μm or more, or 240 μm or more, and 400 μm or less, 350 μm or less, 330 μm or less, 320 μm or less, or 310 μm or less.

In addition, convexity and CE diameter may be measured using several commercial instruments that quantify and analyze particle morphology based on image analysis of the particles. For example, the parameters may be measured by Morphologi 4 from Malvern Panalytical, and specifically, may be measured by the following four steps, which will be described in more detail in the experimental example section described below.

1) Sample preparation: A particle sample of the super absorbent polymer to be measured is prepared. At this time, when convexity is to be measured for particles with a specific particle diameter range, a sample is prepared by classifying particles with a specific particle diameter using a classifier from Retsch at a 1.0 amplitude for 10 minutes.

At this time, the particle diameter of these super absorbent polymer particles may be measured according to the European Disposables and Nonwovens Association (EDANA) standard EDANA WSP 220.3 method.

2) Image acquisition: After setting the prepared sample on the stage inside the equipment, images of individual particles are obtained by scanning at 2.5× magnification.

3) Image processing: For the acquired images, an image obtained by capturing, as a 2D image, a 3D image of each particle, and parameter values such as CE diameter, shortest diameter, longest diameter, actual particle circumference, and convex hull perimeter are measured.

4) Based on the data analyzed for each particle, a distribution map for the parameters for all particles included in the sample is derived.

In one aspect of the present disclosure, the super absorbent polymer may have a gel strength of 0.7 N or more, 0.8 N or more, or 0.9 N or more after swelling the super absorbent polymer with 50 ml of saline containing 0.005% ASC. In addition, the gel strength may be 1.5 N or less, 1.4 N or less, 1.3 N or less, 1.2 N or less, 1.1 N or less, or 1.0 N or less. By having such high gel strength, it is possible to reduce surface crosslinking damage and prevent deterioration of physical properties. In addition, even when the super absorbent polymer absorbs water and its volume increases, it may maintain its shape well, and as a result, exhibit improved absorbency and liquid permeability. The method for measuring the gel strength of the super absorbent polymer will be described in more detail in the experimental example section described below.

In one aspect of the present disclosure, the super absorbent polymer may have an extractable component content of 10 wt % or less, 9.5 wt % or less, or 9 wt % or less, based on the total weight of the super absorbent polymer, as measured after free swelling in water having an electrical conductivity of 100 to 130 μS/cm for 30 minutes.

In addition, in one aspect of the present disclosure, the super absorbent polymer may have an extractable component content of 5 wt % or less, 4.8 wt % or less, 4.5 wt % or less, 4.3 wt % or less, 4 wt % or less, or 3.9 wt % or less, as measured after swelling for 1 hour according to EDANA method WSP 270.3. The lower the value of the content of the extractable component is, the better it is, and the lower limit is theoretically 0 wt %, but may be, for example, 0.1 wt % or more or 1 wt % or more.

In addition, in one aspect of the present disclosure, the super absorbent polymer may have an extractable component content of 17 wt % or less, 16 wt % or less, or 15 wt % or less, based on the total weight of the super absorbent polymer, as measured after free swelling in water having an electrical conductivity of 100 to 130 µS/cm for 3 hours.

The term "extractable component" refers to a compound in the form of a polymer that is not crosslinked during the preparation process of a super absorbent polymer, and the components may be produced when crosslinking is incomplete during polymerization of the super absorbent polymer, resulting in non-crosslinking, or when the crosslinking agent is decomposed or the main polymer chain is broken during the chopping or drying process.

The extractable components may be eluted when the super absorbent polymer is exposed to a liquid, and most of the eluted extractable components remain on the surface of the super absorbent polymer. Due to this, the surface of the super absorbent polymer may become sticky and the liquid permeability may be reduced. This may cause discomfort when the super absorbent polymer is used in actual products.

That is, problems related to crosslinking of the super absorbent polymer may be identified by measuring the content of extractable components eluted from the super absorbent polymer solution. That is, since the content of extractable components is closely related to the inter-chain crosslinked structure within the super absorbent polymer, a large content of eluted extractable components means that the inter-chain crosslinked structure within the super absorbent polymer is incomplete.

Super absorbent polymers are commonly used in sanitary products such as diapers, so the amount of eluted extractable components is evaluated using 0.9% saline, which has similar ion concentration and electrical conductivity to urine discharged from the body.

However, in addition to sanitary products, the super absorbent polymers are now widely used as soil water retainers for horticulture, water-retaining materials for civil engineering and construction, sheets for raising seedlings, and freshness-preserving agents and materials for steaming in the food distribution industry. In this case, the absorption behavior of the extractable components in water having an electrical conductivity of 100 to 130 µS/cm needs to be excellent.

That is, even when the same super absorbent polymer is used, the absorption behavior in water having an electrical conductivity of 100 to 130 µS/cm and the absorption behavior in 0.9% saline with an electrical conductivity of about 16,100 µS/cm are bound to be different.

The content of extractable components is closely related to the inter-chain crosslinked structure within the super absorbent polymer, and when using 0.9% saline, the volume of expansion of the super absorbent polymer is small, so the amount of eluted extractable components is small, but when using water with an electrical conductivity of 100 to 130 µS/cm, the super absorbent polymer expands more, so the amount of eluted extractable components increases due to the separation of the chains within the super absorbent polymer, and through this, the correlation between the inter-chain crosslinked structure within the super absorbent polymer and the absorption behavior can be more accurately identified.

For example, even when two different super absorbent polymers have the same content of extractable components in 0.9% saline, the content of extractable components in water having an electrical conductivity of 100 to 130 µS/cm may vary significantly depending on the crosslinking characteristics because the degree of crosslinking within the super absorbent polymer affects the content of extractable components.

For this reason, the experimental results on the elution amount and absorption characteristics of extractable components after free swelling using 0.9% saline having an electrical conductivity of about 16,100 µS/cm cannot be directly compared with the experimental results after free swelling using water having an electrical conductivity of 100 to 130 µS/cm as in the present disclosure.

That is, when the same super absorbent polymer is used, the absorption behavior in water having an electrical conductivity of 100 to 130 µS/cm and the absorption behavior in 0.9% saline having an electrical conductivity of about 16,100 µS/cm are bound to be different, and thus the content of extractable components after free swelling for 1 hour in water having an electrical conductivity of 100 to 130 µS/cm cannot be used to predict the content of extractable components after free swelling in 0.9% saline having an electrical conductivity of about 16,100 µS/cm, and vice versa.

Therefore, it may be said that determining the elution amount, absorption performance and absorption rate of extractable components in water having an electrical conductivity of 100 to 130 µS/cm to implement a super absorbent polymer having an excellent property balance by simultaneously improving absorption characteristics and liquid permeability is independent of using 0.9% saline having an electrical conductivity of about 16,100 µS/cm.

The method for measuring the content (weight %) of extractable components in water having an electrical conductivity value of 100 to 130 µS/cm will be described in more detail in the experimental example section described below.

In one aspect of the present disclosure, the super absorbent polymer may have a centrifuge retention capacity (CRC) of 30.8 g/g or more, 31.5 g/g or more, 33 g/g or more, 34 g/g or more, or 35 g/g or more, as measured according to EDANA method WSP 241.3. In addition, the centrifuge retention capacity measured by the same method may be 50 g/g or less, 45 g/g or less, or 40 g/g or less.

In addition, in one aspect of the present disclosure, the super absorbent polymer may have an absorbency under pressure (AUP) of 28 g/g or more, 29 g/g or more, or 30 g/g or more, as measured under 0.3 psi according to EDANA method WSP 242.3. In addition, the absorbency under pressure measured by the same method may be 45 g/g or less, 42 g/g or less, or 40 g/g or less.

In addition, in one aspect of the present disclosure, the super absorbent polymer may have an effective absorption capacity (EFFC) of 30 g/g or more, 31 g/g or more, 32 g/g or more, or 33 g/g or more, as calculated by Equation 3 below. In addition, the effective absorption capacity (EFFC) may be 40 g/g or less, 39 g/g or less, 38 g/g or less, 37 g/g or less, or 36 g/g or less, as calculated by Equation 3.

$$EFFC=(CRC+AUP)/2 \qquad \text{[Equation 3]}$$

In Equation 3,

CRC represents a centrifuge retention capacity (units: g/g) as measured according to EDANA method WSP 241.3, and AUP represents an absorbency under pressure (units: g/g) as measured under 0.3 psi according to EDANA method WSP 242.3.

In one aspect of the present disclosure, the super absorbent polymer may have an absorption rate (vortex time) of 40 seconds or less, as measured by a vortex measurement method at 24.0° C.

More specifically, the absorption rate (vortex time) may be 40 seconds or less, 35 seconds or less, 33 seconds or less, or 30 seconds or less. In addition, the smaller the value of the absorption rate is, the better it is, and the lower limit of the absorption rate is theoretically 0 seconds, but may be, for example, 10 seconds or more, 15 seconds or more, or 20 seconds or more.

The methods for measuring the centrifuge retention capacity, absorbency under pressure, and absorption rate of the super absorbent polymer will be described in more detail in the experimental example section described below.

In addition, when the super absorbent polymer of the present disclosure is swollen in water having an electrical conductivity value of 100 to 130 µS/cm for 1 minute, a maximum capacity of water that the super absorbent polymer may hold (free swelling capacity) may be 138 g/g or more, 141 g/g or more, 170 g/g or more, 175 g/g or more, 180 g/g or more, or 185 g/g or more, and 230 g/g or less, 225 g/g or less, or 220 g/g or less. This is a numerical value showing the absorption capacity of the super absorbent polymer.

As described above, even when the same super absorbent polymer is used, the absorption behavior in water having an electrical conductivity of 100 to 130 µS/cm and the absorption behavior in 0.9% saline with an electrical conductivity of about 16,100 µS/cm are bound to be different.

That is, not only the content of extractable components but also the absorption capacity, such as the maximum capacity of water, has an independent meaning when using water having an electrical conductivity of 100 to 130 µS/cm and when using 0.9% saline having an electrical conductivity of about 16,100 µS/cm.

The present inventors have determined the maximum capacity of water that a super absorbent polymer can hold by using water having a lower ion concentration than 0.9% saline and an electrical conductivity at 24° C. of 100 to 130 µS/cm, which is about $\frac{1}{100}$ lower than the electrical conductivity (about 16,100 µS/cm) at 24° C. of 0.9% saline, and in one aspect, water having an electrical conductivity of 110 µS/cm at 24° C. was used. For water having an electrical conductivity in the range of 100 to 130 µS/cm, there is no significant difference in absorption characteristics according to electrical conductivity.

Accordingly, the present inventors sought to develop a super absorbent polymer having an excellent absorption rate and absorption capacity for water having an electrical conductivity of 100 to 130 µS/cm, which has a lower ion concentration and electrical conductivity than 0.9% saline, that is, an electrical conductivity about $\frac{1}{100}$ lower than that of 0.9% saline, and this was implemented by manufacturing the super absorbent polymer to satisfy the T2 relaxation time.

The method of measuring absorption capacity in water having an electrical conductivity value of 100 to 130 µS/cm will be described in more detail in the experimental example section described below.

In one aspect of the present disclosure, the super absorbent polymer may have a liquid permeability of 65 ml or more, as calculated by the following Equation 4. For example, the liquid permeability may be 70 ml or more, 75 ml or more, or 80 ml or more.

$$\text{Perm} = [20 \text{ mL}/T1 \text{ (sec)}] \times 60 \text{ sec} \quad \text{[Equation 4]}$$

In Equation 4,

Perm represents liquid permeability, and

T1 represents the time (seconds) taken for 20 mL of saline to pass through the swollen super absorbent polymer under a pressure of 0.3 psi after placing 0.2 g of a super absorbent polymer in a cylinder, pouring saline (0.9 wt % sodium chloride aqueous solution) so that the super absorbent polymer is completely submerged, and allowing the super absorbent polymer to swell for 30 minutes.

Meanwhile, the term "liquid permeability" refers to the mobility of the solution within the super absorbent polymer, and a higher value means better permeability. That is, there is no theoretical upper limit on the liquid permeability, but it may be, for example, 400 ml or less, 240 ml or less, or 180 ml or less.

That is, the super absorbent polymer according to the present disclosure may have a T1 of 18 seconds or less. For example, a T1 may be 17 seconds or less, 16 seconds or less, or 15 seconds or less. The smaller the value, the better it is. The theoretical lower limit of T1 is 0 seconds. For example, it may be 3 seconds or more, 5 seconds or more, or 10 seconds or more.

Meanwhile, the super absorbent polymer according to the present disclosure may be implemented by appropriately controlling the components/content of the super absorbent polymer, preparation process conditions such as polymerization process conditions of the super absorbent polymer or pulverizing process conditions, and the like. That is, by controlling these process conditions, it is possible to prepare a super absorbent polymer that satisfies the T2 relaxation time.

For example, the type and content of the monomer composition and the type and content of an internal crosslinking agent in a polymerization process; the type, input amount, and input timing of a surfactant, the type, input amount, and input timing of a neutralizing agent, the type, rotational speed, hole size, and number of micronizations of a micronization device in the neutralization and micronization steps, and the like may be controlled so that the super absorbent polymer satisfies the T2 relaxation time.

Hereinafter, each component that makes up the super absorbent polymer will be described in more detail.

A polyacrylic acid (salt)-based super absorbent polymer according to one aspect of the disclosure includes a base resin including a crosslinked polymer of a water-soluble ethylenically unsaturated monomer having an acidic group and an internal crosslinking agent. The crosslinked polymer may be formed by polymerizing a monomer composition including components such as a monomer, an internal crosslinking agent, and a polymerization initiator.

Here, the water-soluble ethylenically unsaturated monomer may be any monomer commonly used in the preparation of a super absorbent polymer. As a non-limiting example, the water-soluble ethylenically unsaturated monomer may be a compound represented by the following Chemical Formula 1:

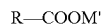   [Chemical Formula 1]

in Chemical Formula 1,

R is a C2 to C5 alkyl group including an unsaturated bond, and

M' is a hydrogen atom, a monovalent or divalent metal, an ammonium group, or an organic amine salt.

For example, the monomer may be one or more selected from the group consisting of a (meth)acrylic acid, and a monovalent (alkali) metal salt, a divalent metal salt, an ammonium salt, and an organic amine salt of this acid.

As such, when the (meth)acrylic acid and/or its salt are/is used as the water-soluble ethylenically unsaturated monomer, a super absorbent polymer with improved absorbency may be obtained, which is advantageous. In addition, as the monomers, maleic anhydride, fumaric acid, crotonic acid, itaconic acid, 2-acryloylethane sulfonic acid, 2-methacryloylethane sulfonic acid, 2-(meth)acryloylpropanesulfonic acid, 2-(meth)acrylamide-2-methyl propane sulfonic acid, (meth)acrylamide, N-substituted (meth)acrylates, 2-hydroxyethyl (meth)acrylate, 2-hydroxypropyl (meth)acrylate, methoxypolyethylene glycol (meth)acrylate, polyethylene glycol (meth)acrylate, (N,N)-dimethylaminoethyl (meth) acrylate, (N,N)-dimethylaminopropyl (meth)acrylamide, or the like may be used.

The water-soluble ethylenically unsaturated monomer has an acidic group. Meanwhile, in the preparation of a super absorbent polymer, a polymer is formed by crosslinking and polymerizing a monomer in which at least some of the acidic groups are neutralized by a neutralizing agent, but in the present disclosure, for example, the acidic groups are not neutralized during polymerization, but may be neutralized after the polymer is formed. More specific details on this will be explained in the section "Preparation method of super absorbent polymer."

The concentration of the water-soluble ethylenically unsaturated monomer in the monomer composition may be appropriately adjusted in consideration of the polymerization time, reaction conditions, and the like, and may be about 20 to about 60 wt % or about 20 to about 40 wt %.

The term "internal crosslinking agent" used in this specification is a term used to distinguish it from a surface crosslinking agent for crosslinking the surface of a super absorbent polymer particles described below, and it serves to form a polymer including a crosslinked structure by introducing crosslinking bonds between the unsaturated bonds of the water-soluble ethylenically unsaturated monomers described above.

The crosslinking in the above step is performed without distinction between the surface and the interior, but when the surface crosslinking process of the super absorbent polymer particles described below is performed, the surface of the finally prepared super absorbent polymer particles may include a structure newly crosslinked by the surface crosslinking agent, and the interior of the super absorbent polymer particles may maintain the structure crosslinked by the internal crosslinking agent.

According to one aspect of the present disclosure, the internal crosslinking agent may include one or more of a polyfunctional acrylate-based compound, a polyfunctional allylic compound, or a polyfunctional vinyl-based compound.

Non-limiting examples of polyfunctional acrylate-based compounds include ethylene glycol di(meth)acrylate, diethylene glycol di(meth)acrylate, triethylene glycol di(meth) acrylate, tetraethylene glycol di(meth)acrylate, polyethylene glycol di(meth)acrylate, propylene glycol di(meth)acrylate, tripropylene glycol di(meth)acrylate, polypropylene glycol di(meth)acrylate, butanediol di(meth)acrylate, butylene glycol di(meth)acrylate, hexanediol di(meth)acrylate, pentaerythritol di(meth)acrylate, pentaerythritol tri(meth)acrylate, pentaerythritol tetra(meth)acrylate, dipentaerythritol di(meth)acrylate, dipentaerythritol tri(meth)acrylate, dipentaerythritol, tetra(meth)acrylate, dipentaerythritol penta(meth)acrylate, trimethylolpropane di(meth)acrylate, trimethylolpropane tri(meth)acrylate, glycerin di(meth)acrylate, or glycerin tri(meth)acrylate, and these may be used alone or in combination of two or more.

Non-limiting examples of polyfunctional allylic compounds include ethylene glycol diallyl ether, diethylene glycol diallyl ether, triethylene glycol diallyl ether, tetraethylene glycol diallyl ether, polyethylene glycol diallyl ether, propylene glycol diallyl ether, tripropylene glycol diallyl ether, polypropylene glycol diallyl ether, butanediol diallyl ether, butylene glycol diallyl ether, hexanediol diallyl ether, pentaerythritol diallyl ether, pentaerythritol triallyl ether, pentaerythritol tetraallyl ether, dipentaerythritol diallyl ether, dipentaerythritol triallyl ether, dipentaerythritol tetraallyl ether, dipentaerythritol pentaallyl ether, trimethylolpropane diallyl ether, trimethylolpropane triallyl ether, glycerin diallyl ether, and glycerin triallyl ether, or these may be used alone or in combination of two or more.

Non-limiting examples of polyfunctional vinyl-based compounds include ethylene glycol divinyl ether, diethylene glycol divinyl ether, triethylene glycol divinyl ether, tetraethylene glycol divinyl ether, polyethylene glycol divinyl ether, propylene glycol divinyl ether, tripropylene glycol divinyl ether, polypropylene glycol divinyl ether, butanediol divinyl ether, butylene glycol divinyl ether, hexanediol divinyl ether, pentaerythritol divinyl ether, pentaerythritol trivinyl ether, pentaerythritol tetravinyl ether, dipentaerythritol divinyl ether, dipentaerythritol trivinyl ether, dipentaerythritol tetravinyl ether, dipentaerythritol pentavinyl ether, trimethylolpropane divinyl ether, trimethylolpropane trivinyl ether, glycerin divinyl ether, or glycerin trivinyl ether, and these may be used alone or in combination of two or more. Preferably, pentaerythritol triallyl ether may be used.

The above-described polyfunctional allylic compound or polyfunctional vinyl-based compound may form a crosslinked structure during the polymerization process by allowing two or more unsaturated groups included in the molecule to bond with unsaturated bonds of water-soluble ethylenically unsaturated monomers or unsaturated bonds of other internal crosslinking agents, and unlike acrylate-based compounds including an ester bond (—(C=O)O—) in the molecule, the crosslinked bond may be more stably maintained even during the neutralization process after the polymerization reaction described below.

Accordingly, the gel strength of the prepared super absorbent polymer may be increased, process stability may be improved during the discharge process after polymerization, and the amount of extractable components may be minimized.

As described above, the extractable components are mainly eluted when the super absorbent polymer absorbs liquid and swells, and a large content of the eluted extractable components may be said to mean that the crosslinking characteristics within the super absorbent polymer are not excellent. In addition, since most of the eluted extractable components remain on the surface of the super absorbent polymer, when the super absorbent polymer is applied to actual products, the liquid permeability may decrease, causing discomfort.

Therefore, as described above, it is necessary to minimize the amount of extractable components of the super absorbent polymer.

Crosslinking polymerization of the water-soluble ethylenically unsaturated monomer in the presence of such an internal crosslinking agent may be performed in the presence of a polymerization initiator and, as needed, a thickener, a plasticizer, a preservation stabilizer, an antioxidant, and the like.

In the monomer composition, such an internal crosslinking agent may be used in an amount of 0.01 to 5 parts by weight based on 100 parts by weight of the water-soluble ethylenically unsaturated monomer. For example, the internal crosslinking agent may be used in an amount of 0.01 parts by weight or more, 0.05 parts by weight or more, or 0.1 parts by weight or more, and 5 parts by weight or less, 3 parts by weight or less, 2 parts by weight or less, 1 part by weight or less, or 0.7 parts by weight or less, based on 100 parts by weight of the water-soluble ethylenically unsaturated monomer. When the content of the internal crosslinking agent is too low, crosslinking may not occur sufficiently, making it difficult to achieve strength above an appropriate level, and when the content of the internal crosslinking agent is too high, the internal crosslinking density may increase, making it difficult to achieve the desired centrifuge retention capacity.

Meanwhile, when the content of the internal crosslinking agent is small to ensure that the base resin has high centrifuge retention capacity (CRC), the gel strength of the formed polymer may be low, and the operation of a chopper and the like may be difficult when cutting the hydrogel polymer due to the low gel strength. In this case, by using a mixture of two or more internal crosslinking agents for operation of a high-speed rotary chopper and the like, the gel strength may be increased, thereby improving the operating stability of the chopper and the like.

In the formed hydrogel polymer, the shape of the particles may vary depending on the degree of internal crosslinking, and the polymer formed using such an internal crosslinking agent can have a three-dimensional network structure in which main chains formed by polymerizing the water-soluble ethylenically unsaturated monomer are crosslinked by the internal crosslinking agent.

As such, when the polymer has a three-dimensional network structure, the overall physical properties of the super absorbent polymer, such as centrifuge retention capacity and absorbency under pressure, may be remarkably improved compared to when the polymer has a two-dimensional linear structure in which additional crosslinking is not performed by an internal crosslinking agent.

The polymer is made by polymerizing a monomer and an internal crosslinking agent in the presence of a polymerization initiator, and the type of polymerization initiator is not particularly limited, but preferably, the polymerization may be performed using a thermal polymerization method in a batch-type reactor, and thus a thermal polymerization initiator may be used as the polymerization initiator.

As the thermal polymerization initiator, one or more selected from the group of initiators consisting of a persulfate-based initiator, an azo-based initiator, hydrogen peroxide, and ascorbic acid may be used. Specifically, examples of persulfate-based initiators include sodium persulfate ($Na_2S_2O_8$), potassium persulfate ($K_2S_2O_8$), and ammonium persulfate (($NH_4)_2S_2O_8$), and examples of azo-based initiators include 2,2-azobis(2-amidinopropane) dihydrochloride, 2,2-azobis-(N,N-dimethylene)isobutyramidine dihydrochloride, 2-(carbamoylazo)isobutylonitrile, 2,2-azobis[2-(2-imidazolin-2-yl)propane]dihydrochloride, or 4,4-azobis-(4-cyanovaleric acid). More diverse thermal polymerization initiators are provided in Odian's book, 'Principle of Polymerization (Wiley, 1981), p 203, which is incorporated herein by reference, and are not limited to the examples described above.

Such polymerization initiators may be used in an amount of 2 parts by weight or less based on 100 parts by weight of the water-soluble ethylenically unsaturated monomer. That is, when the concentration of the polymerization initiator is too low, the polymerization rate may be slow and a large amount of residual monomer may be extracted in the final product, which is not desirable. Conversely, when the concentration of the polymerization initiator is higher than the above range, the polymer chains forming the network become shorter, and thus the properties of the polymer may deteriorate, such as increasing the content of extractable components and decreasing the absorbency under pressure, which is undesirable.

Meanwhile, in one aspect of the present disclosure, polymerization may be initiated by inputting a reducing agent forming a redox couple with the polymerization initiator to the monomer composition.

Specifically, the initiator and reducing agent react with each other to form radicals when input to a polymer solution. The formed radicals react with the monomer, and since the oxidation-reduction reaction between the initiator and the reducing agent is highly reactive, polymerization is initiated even when only a small amount of the initiator and reducing agent is input, so there is no need to increase the process temperature, thereby enabling low-temperature polymerization and minimizing changes in the physical properties of the polymer solution.

The polymerization reaction using the oxidation-reduction reaction may occur smoothly even at a temperature near or lower room temperature (25° C.). For example, the polymerization reaction may be performed at a temperature of 5° C. or higher and 25° C. or lower, or 5° C. or higher and 20° C. or lower.

In one aspect of the present disclosure, when a persulfate-based initiator is used as the initiator, the reducing agent may be one or more selected from the group consisting of sodium metabisulfite ($Na_2S_2O_5$); tetramethyl ethylenediamine (TMEDA); a mixture of iron (II) sulfate and EDTA ($FeSO_4$/EDTA); sodium formaldehyde sulfoxylate; and disodium 2-hydroxy-2-sulfinoacetate.

For example, potassium persulfate may be used as the initiator and disodium 2-hydroxy-2-sulfinoacetate may be used as the reducing agent; ammonium persulfate may be used as the initiator and tetramethylethylenediamine may be used as the reducing agent; or sodium persulfate may be used as the initiator and sodium formaldehyde sulfoxylate may be used as the reducing agent.

In another aspect of the present disclosure, when a hydrogen peroxide-based initiator is used as the initiator, the reducing agent may be one or more selected from the group consisting of ascorbic acid; sucrose; sodium sulfite ($Na_2SO_3$); sodium metabisulfite ($Na_2S_2O_5$); tetramethyl ethylenediamine (TMEDA); a mixture of iron (II) sulfate and EDTA ($FeSO_4$/EDTA); sodium formaldehyde sulfoxylate; disodium 2-hydroxy-2-sulfinoacteate; and disodium 2-hydroxy-2-sulfoacteate.

The monomer composition may additionally include additives such as one or more of a thickener, a plasticizer, a preservation stabilizer, or an antioxidant, as needed.

In addition, the monomer composition including the monomer may be, for example, in a solution state in which it is dissolved in a solvent such as water, and the solid content in the monomer composition in the solution state, i.e., the concentration of a monomer, an internal crosslinking agent and a polymerization initiator, may be appropriately controlled in consideration of the polymerization time and reaction conditions. For example, the solid content in the monomer composition may be 10 to 80 wt %, 15 to 60 wt %, or 30 to 50 wt %.

The solvent that may be used at this time is not limited on its composition as long as it can dissolve the above-described components, and for example, one or more selected from water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethyl ether, toluene, xylene, butyrolactone, carbitol, methyl cellosolve acetate, or N,N-dimethylacetamide may be used in combination.

The polymer obtained in this way may be a polymer having a high molecular weight and a uniform molecular weight distribution by polymerizing an ethylenically unsaturated monomer in an unneutralized state.

In addition, the polymer may have a moisture content of 30 to 80 wt %. For example, the moisture content of the polymer may be 30 wt % or more, 45 wt % or more, or 50 wt % or more, and 80 wt % or less, 70 wt % or less, or 60 wt % or less.

When the moisture content of the polymer is too low, it may be difficult to secure an appropriate surface area in the subsequent pulverizing step, and thus the polymer may not be pulverized effectively, and when the moisture content of the polymer is too high, the pressure applied in the subsequent pulverization step may increase, making it difficult to pulverize to the desired particle size.

Meanwhile, throughout this specification, the term "moisture content" means the content of moisture relative to the total polymer weight and is the value obtained by subtracting the weight of the polymer in a dry state from the weight of the polymer. Specifically, it is defined as a value calculated by measuring the weight reduction due to moisture evaporation in the polymer during the drying process by raising the temperature of the polymer in a crumb state through infrared heating. At this time, the moisture content is measured under the drying conditions set such that the temperature is increased from room temperature to about 180° C. and then maintained at 180° C. and the total drying time is 40 minutes including a 5-minute temperature increase step.

A super absorbent polymer according to one aspect of the disclosure includes a base resin powder including the above-described crosslinked polymer of a water-soluble ethylenically unsaturated monomer having an acidic group and an internal crosslinking agent; and a surface crosslinked layer formed on the base resin powder by further crosslinking the crosslinked polymer via a surface crosslinking agent.

The surface crosslinked layer is formed on at least a portion of the surface of the base resin powder, and may be formed by additional crosslinking of the crosslinked polymer included in the base resin powder via a surface crosslinking agent.

As the surface crosslinking agent, any surface crosslinking agent that has been conventionally used in the preparation of a super absorbent polymer may be used without particular limitation. For example, the surface crosslinking agent may include one or more polyols selected from the group consisting of ethylene glycol, propylene glycol, 1,3-propanediol, 1,4-butanediol, 1,6-hexanediol, 1,2-hexanediol, 1,3-hexanediol, 2-methyl-1,3-propanediol, 2,5-hexanediol, 2-methyl-1,3-pentanediol, 2-methyl-2,4-pentanediol, tripropylene glycol, and glycerol; one or more carbonate-based compounds selected from the group consisting of ethylene carbonate, propylene carbonate, and glycerol carbonate; an epoxy compound such as ethylene glycol diglycidyl ether; an oxazoline compound such as oxazolidinone; a polyamine compound; an oxazoline compound; a mono-, di- or polyoxazolidinone compound; or a cyclic urea compound.

Specifically, one or more, two or more, or three or more of the surface crosslinking agents described above may be used as the surface crosslinking agent, and for example, two of propylene glycol and ethylene glycol diglycidyl ether may be used, or ethylene carbonate-propylene carbonate (ECPC), propylene glycol, and/or glycerol carbonate may be used.

Such surface crosslinking agents may be used in an amount of 0.001 to 0.5 parts by weight based on 100 parts by weight of the super absorbent polymer particles. At this time, 100 parts by weight of the super absorbent polymer particles are based on a dried state. In addition, the content refers to the total amount of the surface crosslinking agent used.

For example, the surface crosslinking agent may be used in an amount of 0.005 parts by weight or more, 0.01 parts by weight or more, or 0.05 parts by weight or more, based on 100 parts by weight of the super absorbent polymer particles. In addition, the surface crosslinking agent may be used in an amount of 0.5 parts by weight or less, 0.4 parts by weight or less, or 0.2 parts by weight or less, based on 100 parts by weight of the super absorbent polymer particles. By adjusting the content range of the surface crosslinking agent within the above range, a super absorbent polymer exhibiting excellent overall physical properties may be prepared.

In addition, the surface crosslinked layer may be formed by adding an inorganic material in addition to the surface crosslinking agent. That is, in the presence of the surface crosslinking agent and the inorganic material, the surface of the base resin powder may be additionally crosslinked to form a surface crosslinked layer.

As such inorganic materials, one or more inorganic materials selected from the group consisting of silica, clay, alumina, a silica-alumina composite material, titania, zinc oxide, and aluminum sulfate may be used. The inorganic material may be used in powder or liquid form. In addition, the inorganic material may be used in an amount of 0.001 to 1 part by weight based on 100 parts by weight of the super absorbent polymer particles. At this time, 100 parts by weight of the super absorbent polymer particles are based on a dried state. In addition, the content refers to the total amount of the inorganic material used.

For example, the inorganic material may be used in an amount of 0.005 parts by weight or more, 0.01 parts by weight or more, or 0.05 parts by weight or more, based on 100 parts by weight of the super absorbent polymer particles. In addition, the inorganic material may be used in an amount of 0.5 parts by weight or less, 0.4 parts by weight or less, or 0.2 parts by weight or less, based on 100 parts by weight of the super absorbent polymer particles. By adjusting the content range of the surface crosslinking agent within the above range, a super absorbent polymer exhibiting excellent overall physical properties may be prepared.

When mixing the surface crosslinking agent and base resin powder, water and methanol may be additionally mixed and added. When adding water and methanol, there is an advantage in that the surface crosslinking agent may be evenly dispersed in the resin composition. At this time, the content of water and methanol added may be appropriately adjusted to induce even dispersion of the surface crosslinking agent, prevent clumping of the resin composition, and optimize the surface penetration depth of the crosslinking agent.

In addition, when mixing the surface crosslinking agent and the base resin powder, a surfactant may be additionally mixed and added, and examples of the surfactant include sucrose stearate. The surfactant may also perform the function of inducing even dispersion of the surface crosslinking agent and preventing clumping of the resin composition.

As described above, a super absorbent polymer including the base resin powder and the surface crosslinked layer formed on the base resin powder may absorb body fluid or water at a fast rate, and may also absorb a relatively large amount initially, thereby preventing problems in that body fluid or water is not absorbed but accumulates or leaks out.

II. Preparation Method of Super Absorbent Polymer

Conventional super absorbent polymers are prepared by crosslinking and polymerizing a water-soluble ethylenically unsaturated monomer having acidic groups, at least some of which is neutralized, in the presence of an internal crosslinking agent and a polymerization initiator to form a hydrogel polymer, drying the hydrogel polymer thus formed, and then pulverizing it to a desired particle size, and at this time, a chopping process of cutting the hydrogel polymer into particles of several millimeters in size is usually performed before the drying process to facilitate drying of the hydrogel polymer and increase the efficiency of the pulverization process. However, in this chopping process, due to the adhesiveness of the hydrogel polymer, the hydrogel polymer is not pulverized to a micro-sized particle level and becomes an aggregated gel. When such an aggregated gel-type hydrogel polymer is dried, a plate-shaped dried product is formed, and in order to pulverize this down to a micro-sized particle level, it must go through a multi-step pulverizing process that reduces the adhesiveness of the polymer, and accordingly, there has been a problem that a lot of fine particles are generated during this process.

To solve this problem, a method was used in which the separated fine particles were mixed with an appropriate amount of water, reassembled into fine particles, and then reused in the chopping step or pre-drying step. However, in the process of reusing the fine particles in this way, problems such as an increase in device load and/or energy usage have occurred. In addition, the properties of the super absorbent polymer were deteriorated due to the fine particles remaining unclassified even after reuse.

As a result of repeated research to solve this problem, it was confirmed that unlike the conventional method of preparing super absorbent polymers in which polymerization is performed in a state where the acidic group of a water-soluble ethylenically unsaturated monomer is neutralized, when polymerization is first performed in a state where the acidic group is not neutralized to form a polymer, the hydrogel polymer is micronized in the presence of a surfactant, and then the acidic group of the polymer is neutralized, or the acidic group of the polymer is neutralized to form a hydrogel polymer and then the hydrogel polymer is micronized in the presence of a surfactant, or the acidic group present in the polymer is neutralized at the same time as the micronization, the surfactant is present in a large amount on the surface of the polymer, and can sufficiently play a role in lowering the high adhesiveness of the polymer, preventing the polymer from excessively agglomerating, and controlling the agglomeration state to a desired level.

Meanwhile, the super absorbent polymer according to the present disclosure may be implemented by controlling the resin components and content, polymerization conditions, or pulverizing process conditions. For example, the type and content of the monomer composition and the type and content of an internal crosslinking agent in a polymerization process; the type, input amount, and input timing of a surfactant, the type, input amount, and input timing of a neutralizing agent, the type, rotational speed, hole size, and number of micronizations of a micronization device in the neutralization and micronization steps; the component and content of the surface crosslinking solution, and the like may be controlled so that the super absorbent polymer satisfies the T2 relaxation time according to the present disclosure.

In particular, the super absorbent polymer may satisfy the T2 relaxation time according to the present disclosure by controlling the amount of neutralizing agent input in the neutralization step, applying an ultrafine pulverization process as a micronization method, or controlling the components and content of the surface crosslinking solution in the surface crosslinking step. The ultrafine pulverization process and the control of the components and contents of the surface crosslinking solution will be described below.

Hereinafter, each step of the method of preparing a super absorbent polymer according to an aspect of the present disclosure will be described in more detail.

Step 1: Polymerization Step

First, a monomer composition including a water-soluble ethylenically unsaturated monomer having an acidic group and an internal crosslinking agent is polymerized to prepare a base resin powder including a polymer in which the water-soluble ethylenically unsaturated monomer having the acidic group and the internal crosslinking agent are crosslinked.

This step may include a step of preparing a monomer composition by mixing a water-soluble ethylenically unsaturated monomer having an acidic group, an internal crosslinking agent, and a polymerization initiator, and a step of polymerizing the monomer composition to form a polymer.

Here, the contents of each component may be the same as in the above-described section "I. Super absorbent polymer".

According to one aspect of the present disclosure, polymerization is first performed in a state where the acidic group of the water-soluble ethylenically unsaturated monomer is not neutralized to form a polymer.

The water-soluble ethylenically unsaturated monomer (e.g., acrylic acid) in which the acidic group is not neutralized is liquid at room temperature and has high miscibility with a solvent (water), so it is present in the state of a mixed solution in the monomer composition. However, a water-soluble ethylenically unsaturated monomer with neutralized acidic groups is solid at room temperature and has different solubility depending on the temperature of the solvent (water), and the solubility decreases at lower temperatures.

As such, a water-soluble ethylenically unsaturated monomer whose acidic group is not neutralized has higher solubility or miscibility in a solvent (water) than a monomer with neutralized acidic groups, so it does not precipitate even at low temperatures, which is advantageous for long-term polymerization at low temperatures. Accordingly, a water-soluble ethylenically unsaturated monomer in which the acidic group is not neutralized may be used for long-term polymerization to stably form a polymer having a higher molecular weight and a uniform molecular weight distribution.

In addition, since the formation of a polymer having a longer chain is possible, the effect of reducing the content of extractable components that are present in a non-crosslinked state due to incomplete polymerization or crosslinking may be achieved, and thus it is suitable for implementing the content of extractable components measured after free swelling in water having an electrical conductivity of 100 to 130 μS/cm for 1 hour according to the present disclosure in the target range.

In addition, in this way, when polymerization is first performed in a state where the acidic groups of the monomer are not neutralized to form a polymer, and the polymer is micronized in the presence of a surfactant after neutralization, neutralization is performed after micronization in the presence of a surfactant, or the acidic groups present in the polymer are neutralized at the same time as micronization, the surfactant may sufficiently play a role in reducing the adhesiveness of the polymer by being present in a large quantity on the surface of the polymer.

According to one aspect of the present disclosure, the step of polymerizing the monomer composition to form a polymer may be performed for 1 hour or more in a batch-type reactor.

In the conventional method of preparing a super absorbent polymer, the polymerization method is largely divided into thermal polymerization and photopolymerization depending on the polymerization energy source, and conventional thermal polymerization may be performed in a reactor with a stirring shaft such as a kneader, and photopolymerization may be performed in a flat-bottomed container.

Meanwhile, when the polymerization is performed as continuous polymerization, for example, when the polymerization is performed in a reactor having a reactor stirring shaft equipped with a conveyor belt, a new monomer composition is supplied to the reactor as the polymerization product moves, so that the polymerization is performed continuously, and thus polymers having different polymerization rates are mixed, and accordingly, it is difficult to achieve even polymerization throughout the monomer composition, which may result in the deterioration of the overall physical properties.

However, according to one aspect of the present disclosure, since polymerization is performed in a fixed-bed manner in a batch-type reactor, there is less concern that polymers with different polymerization rates will be mixed, and thus a polymer with consistent quality may be obtained.

In addition, the polymerization step is performed in a batch-type reactor having a predetermined volume, and the polymerization reaction is performed for a longer duration of time, for example, 1 hour or more, 3 hours or more, or 6 hours or more, than polymerization performed continuously in a reactor equipped with a conveyor belt.

Despite the long polymerization reaction time as described above, since polymerization is performed on a water-soluble ethylenically unsaturated monomer in an unneutralized state, the monomer is not easily precipitated even when polymerization is performed for a long time, and thus it is advantageous for long-term polymerization.

Meanwhile, since polymerization in the batch-type reactor of the present disclosure uses a thermal polymerization method, a thermal polymerization initiator may be used as the polymerization initiator, and the description of the corresponding component is as described above.

Steps 2 and 3: Micronization and Neutralization Steps

Next, the method includes a step of preparing a mixture including a micronized hydrogel polymer by micronizing the hydrogel polymer in the presence of a surfactant (step 2).

The micronization step is a step of micronizing the polymer in the presence of a surfactant, and is a step in which micronization into a size of tens to hundreds of micrometers and agglomeration occur simultaneously, rather than chopping the polymer into a size of millimeters.

That is, it is a step for manufacturing secondary aggregated particles in the form in which primary particles that are micronized into a size of tens to hundreds of micrometers are aggregated by imparting appropriate adhesiveness to the polymer. The hydrous super absorbent polymer particles, which are secondary aggregated particles manufactured through this step, have a normal particle size distribution and a greatly increased surface area, so that the absorption rate may be remarkably improved.

Meanwhile, when a high mechanical shear force is applied in the micronization step to perform ultrafine pulverization at a rotational speed of 500 rpm to 4,000 rpm, agglomerated hydrogel particles having finer pores may be formed.

At this time, when ultrafine pulverizing is performed at a rotational speed of 500 rpm to 4,000 rpm, a high mechanical shear force is applied, so that fine pores of 100 μm or less are easily formed in the polymer, thereby increasing the surface roughness, and the total surface area of the polymer is significantly increased by the pores formed inside and outside the polymer particles. Since the fine pores are formed in a stable form compared to pores formed using a foaming agent in the polymerization step, the degree of fine particles generation by the pores may be remarkably reduced in a subsequent process. The super absorbent polymer particles manufactured in this step can have a remarkably increased surface area and a significantly improved absorption rate, and thus it is suitable for implementing the content of extractable components measured after free swelling in water having an electrical conductivity of 100 to 130 μS/cm for 1 hour according to the present disclosure in the target range.

The ultrafine pulverizing process is performed at a rotational speed of 500 rpm to 4,000 rpm, and when the rotational speed of the process is less than 500 rpm, it is difficult to form sufficient pores to the desired degree, and thus it is difficult to expect a fast absorption rate and secure the desired level of productivity. In addition, when the rotational speed exceeds 4,000 rpm, the polymer chains may be damaged due to excessive shear force, and thus the extractable components may increase, and the overall physical properties of the prepared super absorbent polymer may be somewhat deteriorated. Preferably, the ultrafine pulverization process may be performed at 1,000 rpm to 3,500 rpm, or 2,000 rpm to 3,000 rpm. In this range, it is easy to form the desired fine pores without the above-described problems.

According to one aspect of the present disclosure, the micronization step is performed by a micronization device, the micronization device may include a body part including a transport space in which a polymer is transported therein; a screw member rotatably installed inside the transport space to allow the polymer to move; a driving motor providing a rotational driving force to the screw member; a cutter member installed in the body part to pulverize the polymer; and a porous plate having a plurality of holes formed therein, which discharges the polymer pulverized by the cutter member to the outside of the body part.

At this time, the hole size provided in the porous plate of the micronization device may be 1 mm to 25 mm, 5 mm to 20 mm, or 5 mm to 15 mm.

As such, when the polymer mixed with the surfactant is micronized while controlling agglomeration using a micronization device, a smaller particle size distribution is implemented, and thus the subsequent drying and pulverizing processes may be performed under milder conditions, thereby preventing fine particle generation and improving the properties of the super absorbent polymer, and when ultrafine pulverization is performed, appropriate fine pores may be simultaneously formed on the surface of the polymer to improve the surface area and the absorption rate.

The micronization step may be performed one or more times, preferably one to six times, one to four times, or one to three times. This may be performed using a plurality of microionization devices, or a single microionization device including a plurality of porous plates and/or a plurality of cutter members, or among the plurality of microionization devices, some of the devices may include a plurality of porous plates and/or a plurality of cutter members.

According to one aspect of the present disclosure, a surfactant may be additionally used in the micronization step, and thus agglomeration between polymer particles is effectively controlled, thereby reducing the load on the equipment used in the pulverization process and further improving productivity.

The surfactant may be selected from compounds represented by the following Chemical Formulas 2-1 to 2-14, but is not limited thereto:

[Chemical Formula 2-1]

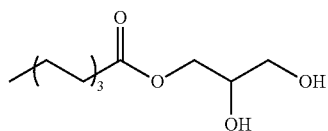

[Chemical Formula 2-2]

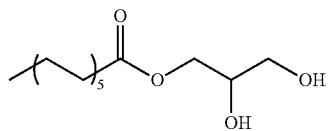

[Chemical Formula 2-3]

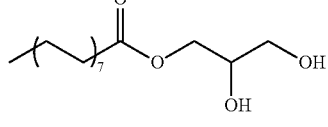

[Chemical Formula 2-4]

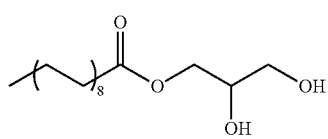

[Chemical Formula 2-5]

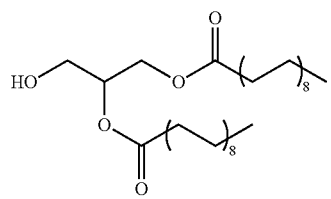

[Chemical Formula 2-6]

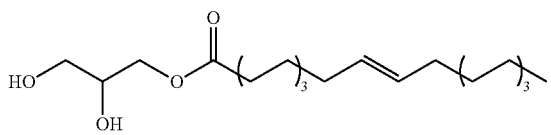

[Chemical Formula 2-7]

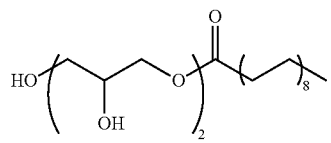

[Chemical Formula 2-8]

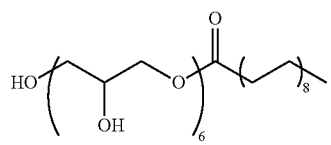

[Chemical Formula 2-9]

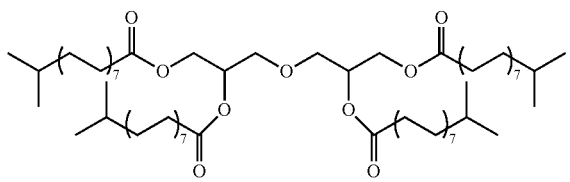

[Chemical Formula 2-10]

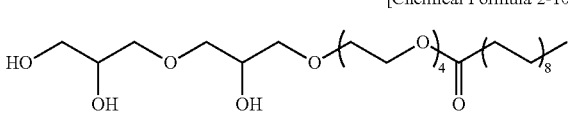

[Chemical Formula 2-11]

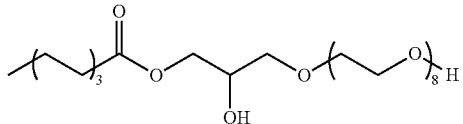

[Chemical Formula 2-12]

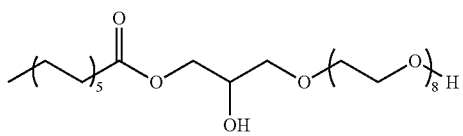

[Chemical Formula 2-13]

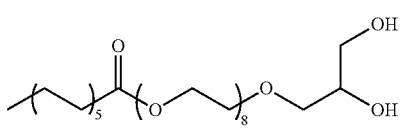

[Chemical Formula 2-14]

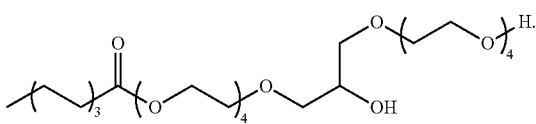

According to one aspect of the present disclosure, the surfactant may be, but is not limited to, glycerol monolaurate (GML).

Meanwhile, the amount of the surfactant used is not particularly limited, but the surfactant may be used in an amount of 0.06 g to 0.48 g per 1,000 g of the hydrogel polymer depending on the productivity required or the device load condition.

When the surfactant is used in an excessively small amount, the surfactant may not be evenly adsorbed on the polymer surface, causing re-agglomeration of particles after pulverizing, or the absorption performance, such as centrifuge retention capacity and absorbency under pressure, may be reduced due to a large part of the surfactant being shared with the polymer. Meanwhile, when the surfactant is used in an excessive amount, the overall properties of the finally prepared super absorbent polymer may deteriorate due to a decrease in surface tension.

Therefore, for example, the surfactant may be used in an amount of 0.06 g or more, 0.1 g or more, or 0.2 g or more, and 0.48 g or less, 0.45 g or less, or 0.4 g or less per 1,000 g of the hydrogel polymer, and thus it is easy to control the content of extractable components measured after free swelling in water having an electrical conductivity of 100 to 130 $\mu$S/cm for 1 hour to the target range according to the present disclosure.

The method for mixing the surfactant with the polymer is not particularly limited, and any method that may evenly mix the surfactant with the polymer may be appropriately adopted and used. Specifically, the surfactant may be mixed in a dry manner, dissolved in a solvent and then mixed in a solution state, or melted and then mixed.

For example, the surfactant may be mixed in a solution state dissolved in a solvent. At this time, any type of solvent may be used without limitation, including inorganic and organic solvents, but water is most appropriate when considering the ease of the drying process and the cost of the solvent recovery system. In addition, the solution may be prepared by mixing the surfactant and the polymer in a reaction tank, by putting the polymer in a mixer and spraying the solution, or by continuously supplying the polymer and the solution to a continuously operating mixer.

Meanwhile, when the surfactant is mixed in a solution state in which it is dissolved in water, it may be used after being diluted to an aqueous solution with a concentration of about 0.01% to 10%.

For example, when the surfactant is to be used in an amount of 0.1 g per 1,000 g of the hydrogel polymer, 100 g of an aqueous solution having a concentration of 0.1%, in which 0.1 g of the surfactant is dissolved in 99.9 g of water, may be used. Alternatively, 10 g of an aqueous solution having a concentration of 1%, in which 0.1 g of surfactant is dissolved in 9.9 g of water, may be used.

That is, when using the same amount of surfactant, the water content may be increased or decreased to use the surfactant in an aqueous solution having a desired concentration, and the concentration may be appropriately adjusted in consideration of the properties of the super absorbent polymer to be finally prepared.

Meanwhile, when the surfactant is hydrophobic and has very low solubility in water, the surfactant may be mixed with the polymer in a dry manner, or the surfactant may be used in a form in which the surfactant is dispersed in water by inputting the surfactant into water. For example, when the surfactant is dry mixed in powder form and dispersed in a polymer, the degree of dispersion is very weak, so the surfactant may be used by dispersing it in water so that it is evenly applied to the surface.

According to one aspect of the present disclosure, a step of neutralizing at least some of the acidic groups of the polymer (step 3) is performed, and the micronization step of step 2 described above and the neutralization step of step 3 may be performed sequentially, alternately, or simultaneously.

That is, a neutralizing agent may be input to the polymer to first neutralize the acidic group, and then a surfactant may be input to the neutralized polymer to micronize the polymer mixed with the surfactant (performed in the order of step 3→step 2), or a neutralizing agent and a surfactant may be input to the polymer at the same time to neutralize and micronize the polymer (perform steps 2 and 3 at the same time). Alternatively, the surfactant may be input first and then the neutralizing agent may be input (performed in the order of step 2→step 3). Alternatively, the neutralizing agent and the surfactant may be input alternately. Alternatively, the surfactant may be input first to form fine particles, then a neutralizing agent may be input to neutralize the fine particles, and then an additional surfactant may be input to the neutralized hydrogel polymer to further perform the micronization process.

In this case, when the neutralization step is performed independently from the micronization step of step 2, it may be performed in a manner in which the additive is input simultaneously with the pulverization of the polymer. More specifically, a screw-type extruder including a porous plate having a plurality of holes formed therein may be used. The screw-type extruder is a device that performs pulverization under mild conditions compared to the above-described micronization device used in the micronization step, and the rotational speed may be about 150 rpm to 500 rpm, and the holes of the porous plate may have a size of about 3 mm to 25 mm, but are not limited thereto.

The rotational speed and porous plate hole size of the screw-type extruder affect the discharge state of the super absorbent polymer discharged from the extruder, and the particle shape of the super absorbent polymer may change depending on the discharge state.

In particular, by controlling the rotational speed of the screw-type extruder to 150 rpm to 500 rpm, the content of extractable components measured after free swelling for 1 hour in water having an electrical conductivity of 100 to 130 µS/cm according to the present disclosure may be controlled within a desired range.

At this time, basic materials such as sodium hydroxide, potassium hydroxide, and ammonium hydroxide that can neutralize acidic groups may be used as neutralizing agents.

In addition, the degree of neutralization, which refers to the degree at which acidic groups included in the polymer are neutralized by the neutralizing agent, may be 50 to 90 mol %, 60 to 85 mol %, 65 to 85 mol %, or 65 to 80 mol %. The range of the degree of neutralization may vary depending on the final properties, and the absorption rate and absorption performance may be controlled by adjusting the degree of neutralization.

At this time, when the degree of neutralization is too high, the absorption capacity of the super absorbent polymer may decrease, and since the concentration of carboxyl groups on the particle surface is too low, it may be difficult to properly perform surface crosslinking in a subsequent process, which may result in a decrease in absorbency under pressure or liquid permeability. On the other hand, when the degree of neutralization is too low, not only may the absorbency of the polymer greatly decrease, but it may also exhibit properties similar to elastic rubber that are difficult to handle.

Meanwhile, it may be desirable to have a certain time gap between the inputting of the neutralizing agent and the micronization process to ensure even neutralization of the entire polymer.

Step 4: Drying Step

Next, a step of drying the micronized and neutralized polymer to prepare a base resin powder (step 4) is performed.

This step is a step of drying the moisture in the base resin powder, which is a polymer obtained by neutralizing at least some of the acidic groups of the polymer and microionizing the polymer.

In a conventional method of preparing a super absorbent polymer, the drying step is performed so that the moisture content of the base resin powder becomes about 4 to 20 wt %, about 4 to about 15 wt %, or about 6 to about 13 wt %. However, the present disclosure is not limited thereto.

Step 4 may be performed by fixed-bed type drying, moving type drying, or a combination thereof.

According to one aspect of the disclosure, step 4 may be performed by fixed-bed type drying.

The fixed-bed type drying refers to a method in which the material to be dried is placed on a porous iron plate through which air can pass and the material is dried by passing hot air from the bottom to the top.

Since the fixed-bed type drying dries in a plate-like shape without particle movement, it is difficult to achieve uniform drying simply by the flow of hot air. Therefore, fixed-bed type drying requires delicate control of hot air and temperature to obtain a dried product having a uniform high-moisture content. In the present disclosure, by changing the direction of hot air from the bottom to the top, the plate-shaped dried product is prevented from bending during drying, thereby preventing the hot air from leaking. In addition, the drying temperature was changed by section so that the upper, middle, and lower layers inside the dried product could be dried evenly with a moisture content difference of less than 5%.

Devices that may be used for drying using the fixed-bed type drying method include, but are not limited to, belt-type dryers.

For the fixed-bed type drying step, the drying process may be performed at a temperature of about 80° C. to 200° C., preferably 90° C. to 190° C. or 100° C. to 180° C. When the drying temperature is lower than 80° C., the drying time may become too long, and when the drying temperature is higher than 200° C. and too high, a super absorbent polymer having a moisture content lower than the desired moisture content may be obtained. Meanwhile, the term "drying temperature" may mean the temperature of the hot air used or the internal temperature of the instrument during the drying process.

According to one aspect of the disclosure, step 4 may be performed by moving type drying.

The term "moving type drying" refers to a drying method in which the dried product is mechanically stirred during drying. At this time, the direction in which the hot air passes through the material may be the same as or different from the direction in which the material circulates. Alternatively, the material may be dried by circulating it inside the dryer and passing a heat-mediating fluid (heat-mediating oil) through a separate pipe outside the dryer.

Devices that may be used for drying using this moving type drying method may include a horizontal-type mixer, a rotary kiln, a paddle dryer, a steam tube dryer, or a commonly used moving type dryer.

For the moving type drying step, the drying process may be performed at a temperature of about 100° C. to 300° C., preferably 120° C. to 280° C. or 150° C. to 250° C. When the drying temperature is too low, such as below 100° C., the drying time may become too long, and when the drying temperature is too high, such as above 300° C., the polymer chain of a super absorbent polymer may be damaged, resulting in a decline in overall physical properties, and a super absorbent polymer having a lower moisture content than the desired moisture content may be obtained.

Step 5: Pulverization Step

Next, a step of pulverizing the dried base resin powder is performed.

Specifically, the pulverization step may be performed by pulverizing the dried base resin powder to have a particle size of a normal particle level, i.e., a particle size of 150 µm to 850 µm.

The pulverizer used for this purpose may be specifically a vertical grinder, a turbo cutter, a turbo grinder, a rotary cutter mill, a cutter mill, a disc mill, a shred crusher, a crusher, a chopper, or a disc cutter, but is not limited to these examples.

Alternatively, a pulverizer such as a pin mill, a hammer mill, a screw mill, a roll mill, a disc mill or a jog mill may be used, but is not limited to these examples.

Meanwhile, in the preparation method of the present disclosure, in the micronization step, super absorbent polymer particles having a smaller particle size distribution than in the conventional chopping step may be implemented, and since the moisture content after drying is maintained relatively high, even when the pulverizing is performed under mild conditions with a smaller pulverizing force, a super absorbent polymer having a very high content of particles with a normal particle size of 150 μm to 850 μm can be formed, and the fine particle generation ratio may be greatly reduced.

The super absorbent polymer particles manufactured as described above may include super absorbent polymer particles having a particle diameter of 150 μm to 850 μm, i.e., normal particles in an amount of 80 wt % or more, 85 wt % or more, 89 wt % or more, 90 wt % or more, 92 wt % or more, 93 wt % or more, 94 wt % or more, or 95 wt % or more, based on the total weight. The particle diameter of these super absorbent polymer particles may be measured according to the European Disposables and Nonwovens Association (EDANA) standard EDANA WSP 220.3 method.

In addition, the super absorbent polymer particles may include fine particles having a particle diameter of less than 150 m in an amount of about 20 wt % or less, about 18 wt % or less, about 15 wt % or less, about 13 wt % or less, about 12 wt % or less, about 11 wt % or less, about 10 wt % or less, about 9 wt % or less, about 8 wt % or less, or about 5 wt % or less, based on the total weight. This is in contrast to the case where the super absorbent polymer prepared using a conventional manufacturing method has a fine particle content of about 20 wt % to about 30 wt %.

Additive Input Step

Meanwhile, according to one aspect of the disclosure, a step of inputting an additive to the micronized and neutralized polymer may be further included before the drying step (step 4).

The additive input process is a process for improving properties by using additional additives within a range that does not hinder the desired effect, and the types of additives are not particularly limited, and examples thereof include, but are not limited to, a polymerization initiator for removing residual monomers, a liquid permeability improver for improving absorption properties, a fine particle recycling agent for recycling the fine particles generated, an anti-caking agent, a fluidity improver, an antioxidant, a neutralizing agent, a surfactant, and the like.

The additive input step may be performed simultaneously with step 2, simultaneously with step 3, after steps 2 and 3, or in one or more of these steps. The additive input step may be performed multiple times as needed, and may also be performed more than once in each step.

When the additive input step is performed independently from steps 2 and 3, i.e., after step 2 and step 3 but before step 4, the additives may be input simultaneously with the polymer being pulverized.

The pulverization may be the same as the pulverization step of step 5 described above, and the additive may be input once or multiple times during the pulverization step and mixed with the polymer.

Classification Step

Next, after the step of pulverizing the base resin powder (step 5), a step of classifying the pulverized super absorbent polymer particles according to particle diameter may be further included.

Step 6: Surface Crosslinking Step

In addition, the method may further include a step of forming a surface crosslinked layer on at least a portion of the surface of the base resin particles in the presence of a surface crosslinking agent after pulverizing (step 5) and/or classifying the base resin powder. Through this step, the crosslinked polymer included in the base resin powder may be additionally crosslinked via a surface crosslinking agent, so that a surface crosslinked layer may be formed on at least a portion of the surface of the base resin powder.

The description of the surface crosslinking agent may all be the same as described above. In addition, the description of water, methanol, and surfactant added when mixing the surface crosslinking agent and base resin powder may all be applied as described above.

In addition, there is no limitation on the configuration of the method of mixing the surface crosslinking agent with the base resin powder. For example, a method in which a composition including a surface crosslinking agent and a base resin powder is placed in a reaction tank and mixed, a method in which a surface crosslinking agent is sprayed onto the composition, and a method in which the resin composition and the surface crosslinking agent are continuously supplied to a continuously operating mixer and mixed may be used.

The surface crosslinking process may be performed at a temperature of about 80° C. to about 250° C. More specifically, the surface crosslinking process may be performed at a temperature of about 100° C. to about 220° C., or about 120° C. to about 200° C., for about 20 minutes to about 2 hours or about 40 minutes to about 80 minutes. When the above-described conditions for the surface crosslinking process are met, the surface of the super absorbent polymer particles may be sufficiently crosslinked, thereby increasing the absorbency under pressure.

The temperature-increasing means for the surface crosslinking reaction is not particularly limited.

Heating may be accomplished by supplying a heat medium or directly supplying a heat source. At this time, the types of heating medium that may be used include, but are not limited to, heated fluids such as steam, hot air, and hot oil, and the temperature of the supplied heating medium may be appropriately selected considering the means of the heating medium, the heating rate, and the target temperature for heating. Meanwhile, as a directly supplied heat source, methods including heating through electricity and heating through gas may be used, but are not limited to these examples.

Post-Treatment Step

According to one aspect of the present disclosure, the method may further include, after forming a surface crosslinked layer on at least a portion of the surface of the base resin powder, at least one of a cooling step for cooling the super absorbent polymer particles on which the surface crosslinked layer is formed, a watering step for inputting water to the super absorbent polymer particles on which the surface crosslinked layer is formed, and a post-treatment step for inputting an additive to the super absorbent polymer particles on which the surface crosslinked layer is formed. At this time, the cooling step, the watering step, and the post-treatment step may be performed sequentially or simultaneously.

Water or saline may be used in the watering step, thereby controlling the generation amount of riddlings and the like. The amount of water used may be appropriately adjusted considering the moisture content of a desired final product and the like, and is preferably 0.1 to 10 wt %, 0.5 to 8 wt %, or 1 to 5 wt % of water relative to the absorbent polymer, but is not limited thereto.

In addition, a maturation step may be further performed after the watering step.

When using saline in the watering step, the solution absorption rate is relatively low due to the conductivity of the saline, so that the saline evenly spreads in the maturation step, enabling even absorption for the absorbent polymer.

The maturation step may be performed by a commonly used method without any special limitation, for example, at a temperature of 100° C. or lower, 80° C. or lower, preferably 50° C. or lower for 10 minutes to 1 hour using a rotary stirring device.

The additives input in the post-treatment step may include surfactants, inorganic salts, liquid permeability improvers, anti-caking agents, fluidity improvers, and antioxidants, but the present disclosure is not limited thereto.

By selectively performing the cooling step, watering step, and post-treatment step, the moisture content of the final super absorbent polymer may be improved by controlling the occurrence of riddlings and the like, and a higher quality super absorbent polymer product may be manufactured.

Hereinafter, the operation and effect of the disclosure will be described in more detail through specific examples of the disclosure. However, the following examples are only presented as examples of the disclosure, and the scope of the disclosure is not determined thereby.

EXAMPLES

1) Example 1

(Step 1: Polymerization Step—Hydrogel Polymer Preparation Step)

In a 2 L glass container equipped with a stirrer and a thermometer, 1,000 g of acrylic acid, 2.5 g of pentaerythritol triallyl ether (PETTAE) as an internal crosslinking agent, and 2,260 g of water were mixed while stirring. At this time, a reaction temperature was maintained at 5° C. Nitrogen was input at a rate of 1,000 cc/min into the glass container including the mixture for 1 hour to replace the inside of the glass container with nitrogen. Thereafter, 13.0 g of a 0.3% hydrogen peroxide aqueous solution, 15.0 g of a 1% ascorbic acid aqueous solution, and 30.0 g of a 2% 2,2'-azobis amidinopropane dihydrochloride aqueous solution were input as polymerization initiators. At the same time, 15.0 g of a 0.01% iron sulfate aqueous solution as a reducing agent was added and mixed to initiate polymerization. A polymerization reaction was initiated in the mixture, and after the temperature of the polymer reached 85° C., the polymerization was performed in an oven at 90±2° C. for about 6 hours to prepare a hydrogel polymer.

(Steps 2 and 3: Micronization and Neutralization Steps)

1,000 g of the hydrogel polymer obtained in step 1 and 0.1 g of glycerol monolaurate (GML) were dissolved in water at 60° C. or higher and input into a cylindrical grinder in the form of an aqueous solution. Thereafter, a high-speed rotary chopper (F-150/Karl Schnell) equipped inside the cylindrical grinder was used to push the hydrogel polymer aqueous solution through a porous plate with multiple 10 mm holes at a rotational speed of 1,600 rpm. Subsequently, the polymer was further pushed through a porous plate with multiple 10 mm holes at a rotational speed of 2,000 rpm to obtain a pulverized gel-type hydrogel polymer. Thereafter, the pulverized gel-type hydrogel polymer was pushed three times through a porous plate with multiple 6 mm holes at a rotational speed of 250 rpm using a screw-type extruder equipped inside the cylindrical grinder to obtain hydrous super absorbent polymer particles.

At this time, in the first pass through the porous plate, 460 g of a 32% NaOH aqueous solution was input, and in the second pass, 42.8 g of a 0.5% $Na_2S_2O_8$ aqueous solution (SPS aqueous solution) was input and pushed through the porous plate. In the third pass, it was passed through the porous plate without adding any additives.

(Step 4: Drying Step)

The hydrous super absorbent polymer particles obtained as a result of the pulverization were placed on a porous plate capable of vertically transferring air flow, and dried at 120° C. for 40 minutes using an air-flow oven.

200° C. hot air and 100° C. hot air were sequentially flowed from the top to the bottom for 5 minutes and 10 minutes, respectively, so that the moisture content of the dried super absorbent polymer became about 10%, and then 100° C. hot air was flowed from the bottom to the top for 15 minutes to uniformly dry the hydrous super absorbent polymer particles, thereby obtaining a dried product.

(Step 5: Pulverization and Classification Step)

The dried product was ground with a grinder (GRAN-U-LIZERM, MPE) and then classified through a standard mesh sieve of ASTM standards to obtain a base resin powder having a size of 150 to 850 μm.

(Step 6: Surface Crosslinking Step)

Next, as described in Table 1 below, 100 g of the base resin powder was mixed with a surface crosslinking agent aqueous solution including 4 g of water, 6 g of methanol, 0.08 g of ethylene glycol diglycidyl ether (EJ-1030S), 0.1 g of propylene glycol, 0.2 g of aluminum sulfate, and 0.1 g of silica particles (Aerosil 200). At this time, the surface crosslinking agent aqueous solution was mixed so as to be evenly distributed on the super absorbent polymer powder.

Subsequently, the base resin powder mixed with the surface crosslinking solution was placed in a surface crosslinking reactor, and a surface crosslinking reaction was performed to obtain a surface-crosslinked super absorbent polymer.

Specifically, in the surface crosslinking reactor, the base resin powder was subjected to a surface crosslinking reaction at 140° C. for 50 minutes.

After the surface crosslinking step, a super absorbent polymer having a particle size of 150 μm to 850 μm was prepared by classification through a standard mesh sieve according to ASTM standards.

2) Example 2

(Step 1: Polymerization Step—Hydrogel Polymer Preparation Step)

A hydrogel polymer was prepared in the same manner as in Example 1.

(Steps 2 and 3: Micronization and Neutralization Steps)

Hydrous super absorbent polymer particles were obtained in the same manner as in Example 1, except that 405 g of a 32% NaOH aqueous solution was input instead of 460 g of a 32% NaOH aqueous solution in the first pass through the porous plate in Example 1.

(Step 4: Drying Step)

The hydrous super absorbent polymer particles were uniformly dried in the same manner as in Example 1 to obtain a dried product.

(Step 5: Pulverization and Classification Step)

The dried product was ground with a grinder (GRAN-U-LIZERM, MPE) and then classified through a standard mesh sieve of ASTM standards to obtain a base resin powder having a size of 150 to 850 μm.

(Step 6: Surface Crosslinking Step)

A super absorbent polymer of Example 2 was prepared by performing the surface crosslinking step in the same manner as in Example 1, except that the components and contents of the surface crosslinking agent aqueous solution were used as described in Table 1 below.

3) Example 3

(Step 1: Polymerization Step—Hydrogel Polymer Preparation Step)

A hydrogel polymer was prepared in the same manner as in Example 1.

(Steps 2 and 3: Micronization and Neutralization Steps)

1,000 g of the hydrogel polymer obtained in step 1 and 0.1 g of glycerol monolaurate (GML) were dissolved in water at 60° C. or higher and input into a cylindrical grinder in the form of an aqueous solution. Thereafter, a high-speed rotary chopper (F-150/Karl Schnell) equipped inside the cylindrical grinder was used to push the hydrogel polymer aqueous solution through a porous plate with multiple 10 mm holes at a rotational speed of 1,500 rpm. Subsequently, the polymer was further pushed through a porous plate with multiple 12 mm holes at a rotational speed of 2,500 rpm to obtain a pulverized gel-type hydrogel polymer. Thereafter, the pulverized gel-type hydrogel polymer was pushed three times through a porous plate with multiple 6 mm holes at a rotational speed of 250 rpm using a screw-type extruder equipped inside the cylindrical grinder to obtain hydrous super absorbent polymer particles.

At this time, in the first pass through the porous plate, 400 g of a 32% NaOH aqueous solution was input, and in the second pass, 42.8 g of a 0.5% $Na_2S_2O_8$ aqueous solution (SPS aqueous solution) was input and pushed through the porous plate. In the third pass, it was passed through the porous plate without adding any additives.

(Step 4: Drying Step)

The hydrous super absorbent polymer particles were uniformly dried in the same manner as in Example 1 to obtain a dried product.

(Step 5: Pulverization and Classification Step)

The dried product was ground with a grinder (GRAN-U-LIZERM, MPE) and then classified through a standard mesh sieve of ASTM standards to obtain a base resin powder having a size of 150 to 850 μm.

(Step 6: Surface Crosslinking Step)

A super absorbent polymer of Example 3 was prepared by performing the surface crosslinking step in the same manner as in Example 1, except that the components and contents of the surface crosslinking agent aqueous solution were used as described in Table 1 below.

4) Example 4

(Step 1: Polymerization Step—Hydrogel Polymer Preparation Step)

A hydrogel polymer was prepared in the same manner as in Example 1.

(Steps 2 and 3: Micronization and Neutralization Steps)

1,000 g of the hydrogel polymer obtained in step 1 and 0.1 g of glycerol monolaurate (GML) were dissolved in water at 60° C. or higher and input into a cylindrical grinder in the form of an aqueous solution. Thereafter, a high-speed rotary chopper (F-150/Karl Schnell) equipped inside the cylindrical grinder was used to push the hydrogel polymer aqueous solution through a porous plate with multiple 8 mm holes at a rotational speed of 1,200 rpm. Subsequently, the polymer was further pushed through a porous plate with multiple 10 mm holes at a rotational speed of 2,800 rpm to obtain a pulverized gel-type hydrogel polymer. Thereafter, the pulverized gel-type hydrogel polymer was pushed three times through a porous plate with multiple 6 mm holes at a rotational speed of 250 rpm using a screw-type extruder equipped inside the cylindrical grinder to obtain hydrous super absorbent polymer particles.

At this time, in the first pass through the porous plate, 365 g of a 32% NaOH aqueous solution was input, and in the second pass, 42.8 g of a 0.5% $Na_2S_2O_8$ aqueous solution (SPS aqueous solution) was input and pushed through the porous plate. In the third pass, it was passed through the porous plate without adding any additives.

(Step 4: Drying Step)

The hydrous super absorbent polymer particles were uniformly dried in the same manner as in Example 1 to obtain a dried product.

(Step 5: Pulverization and Classification Step)

The dried product was ground with a grinder (GRAN-U-LIZERM, MPE) and then classified through a standard mesh sieve of ASTM standards to obtain a base resin powder having a size of 150 to 850 μm.

(Step 6: Surface Crosslinking Step)

A super absorbent polymer of Example 4 was prepared by performing the surface crosslinking step in the same manner as in Example 1, except that the components and contents of the surface crosslinking agent aqueous solution were used as described in Table 1 below.

5) Comparative Example 1

(Step 1: Polymerization Step—Hydrogel Polymer Preparation Step)

A hydrogel polymer was prepared in the same manner as in Example 1.

(Steps 2 and 3: Micronization and Neutralization Steps)

Hydrous super absorbent polymer particles were obtained in the same manner as in Example 1, except that 300 g of a 32% NaOH aqueous solution was input instead of 475 g of a 32% NaOH aqueous solution in the first pass through the porous plate in Example 1.

(Step 4: Drying Step)

The hydrous super absorbent polymer particles were uniformly dried in the same manner as in Example 1 to obtain a dried product.

(Step 5: Pulverization and Classification Step)

The dried product was ground with a grinder (GRAN-U-LIZERM, MPE) and then classified through a standard mesh sieve of ASTM standards to obtain a base resin powder having a size of 150 to 850 μm.

(Step 6: Surface Crosslinking Step)

A super absorbent polymer of Comparative Example 1 was prepared by performing the surface crosslinking step in the same manner as in Example 1, except that the components and contents of the surface crosslinking agent aqueous solution were used as described in Table 1 below.

6) Comparative Example 2

(Step 1: Polymerization Step—Hydrogel Polymer Preparation Step)

A hydrogel polymer was prepared in the same manner as in Example 1.

(Steps 2 and 3: Micronization and Neutralization Steps)

1,000 g of the hydrogel polymer obtained in step 1 and 0.1 g of glycerol monolaurate (GML) were dissolved in water at 60° C. or higher and input into a cylindrical grinder in the form of an aqueous solution. Thereafter, a high-speed rotary chopper (F-150/Karl Schnell) equipped inside the cylindrical grinder was used to push the hydrogel polymer aqueous solution through a porous plate with multiple 10 mm holes at a rotational speed of 1,400 rpm. Subsequently, the polymer was further pushed through a porous plate with multiple 8 mm holes at a rotational speed of 2,700 rpm to obtain a pulverized gel-type hydrogel polymer. Thereafter, the pulverized gel-type hydrogel polymer was pushed three times through a porous plate with multiple 6 mm holes at a rotational speed of 250 rpm using a screw-type extruder equipped inside the cylindrical grinder to obtain hydrous super absorbent polymer particles.

At this time, in the first pass through the porous plate, 320 g of a 32% NaOH aqueous solution was input, and in the second pass, 42.8 g of a 0.5% $Na_2S_2O_8$ aqueous solution (SPS aqueous solution) was input and pushed through the porous plate. In the third pass, it was passed through the porous plate without adding any additives.

(Step 4: Drying Step)

The hydrous super absorbent polymer particles were uniformly dried in the same manner as in Example 1 to obtain a dried product.

(Step 5: Pulverization and Classification Step)

The dried product was ground with a grinder (GRAN-U-LIZERM, MPE) and then classified through a standard mesh sieve of ASTM standards to obtain a base resin powder having a size of 150 to 850 μm.

(Step 6: Surface Crosslinking Step)

A super absorbent polymer of Comparative Example 2 was prepared by performing the surface crosslinking step in the same manner as in Example 1, except that the components and contents of the surface crosslinking agent aqueous solution were used as described in Table 1 below.

7) Comparative Example 3

(Step 1: Polymerization Step—Hydrogel Polymer Preparation Step)

A hydrogel polymer was prepared in the same manner as in Example 1.

(Steps 2 and 3: Micronization and Neutralization Steps)

1,000 g of the hydrogel polymer obtained in step 1 and 0.1 g of glycerol monolaurate (GML) were dissolved in water at 60° C. or higher and input into a cylindrical grinder in the form of an aqueous solution. Thereafter, a high-speed rotary chopper (F-150/Karl Schnell) equipped inside the cylindrical grinder was used to push the hydrogel polymer aqueous solution through a porous plate with multiple 10 mm holes at a rotational speed of 1,750 rpm. Subsequently, the polymer was further pushed through a porous plate with multiple 8 mm holes at a rotational speed of 2,200 rpm to obtain a pulverized gel-type hydrogel polymer. Thereafter, the pulverized gel-type hydrogel polymer was pushed three times through a porous plate with multiple 6 mm holes at a rotational speed of 250 rpm using a screw-type extruder equipped inside the cylindrical grinder to obtain hydrous super absorbent polymer particles.

At this time, in the first pass through the porous plate, 340 g of a 32% NaOH aqueous solution was input, and in the second pass, 42.8 g of a 0.5% $Na_2S_2O_8$ aqueous solution (SPS aqueous solution) was input and pushed through the porous plate. In the third pass, it was passed through the porous plate without adding any additives.

(Step 4: Drying Step)

The hydrous super absorbent polymer particles were uniformly dried in the same manner as in Example 1 to obtain a dried product.

(Step 5: Pulverization and Classification Step)

The dried product was ground with a grinder (GRAN-U-LIZERM, MPE) and then classified through a standard mesh sieve of ASTM standards to obtain a base resin powder having a size of 150 to 850 μm.

(Step 6: Surface Crosslinking Step)

A super absorbent polymer of Comparative Example 3 was prepared by performing the surface crosslinking step in the same manner as in Example 1, except that the components and contents of the surface crosslinking agent aqueous solution were used as described in Table 1 below.

8) Comparative Example 4

In Comparative Example 4, a super absorbent polymer was prepared by a method of preparing a super absorbent polymer, including neutralizing at least some of the acidic groups of a water-soluble ethylenically unsaturated monomer (neutralization); crosslinking and polymerizing a water-soluble ethylenically unsaturated monomer having at least some of the acidic groups neutralized in the presence of an internal crosslinking agent and a polymerization initiator to form a hydrogel polymer (polymerization); chopping the hydrogel polymer (chopping); drying the chopped hydrogel polymer (drying); pulverizing the dried polymer and then classifying it into normal particles and fine particles (pulverization/classification); and forming a surface crosslinked layer on at least a portion of the surface of the normal particles in the presence of a surface crosslinking agent (surface crosslinking).

Specifically, the preparation process of Comparative Example 4 was as follows.

(Neutralization and Polymerization)

A monomer composition was prepared by mixing 495 g of acrylic acid, 0.4 g of ethylene glycol diglycidyl ether as an internal crosslinking agent, 19.2 g of 1% IGAGURE 819 as a photopolymerization initiator, 0.6 g of capsule-type foaming agent F-36D as a foaming agent, 0.1 g of sodium dodecyl sulfate as a foaming stabilizer, and 292.6 g of water in a 3 L glass container equipped with a stirrer and a thermometer. Subsequently, while the monomer solution was continuously supplied using a quantitative pump, 611.1 g of a 32% NaOH aqueous solution was continuously mixed through the line to prepare a monomer aqueous solution. At this time, after confirming that the temperature of the monomer aqueous solution had risen to approximately 72° C. or higher due to the heat of neutralization, waiting was performed for the temperature to decrease to 40° C. When the temperature decreased to 40° C., 41.2 g of a 2 wt % sodium persulfate aqueous solution and 21.2 g of a mixed solution of 0.6 g of sodium bicarbonate dissolved in a 1 wt % sodium dodecyl sulfate aqueous solution were added. The resulting mixture was placed in a stainless steel vessel measuring 250 mm in width, 250 mm in length, and 30 mm in height, which was installed in a square polymerization reactor equipped with a light irradiation device on the top and preheated to 80° C. inside, and light irradiation was performed to initiate photopolymerization. It was confirmed that after about 15 seconds of light irradiation, a gel was generated from the surface, and after approximately 30 seconds, a polymerization reaction occurred simultaneously with foaming, and a sheet-type hydrogel polymer was obtained by additionally reacting for 3 minutes.

(Chopping)

The hydrogel polymer was cut into 5 cm wide and 5 cm long pieces, and pulverized using a screw-type chopper (meat chopper) equipped with a porous plate including numerous holes. At this time, the rotational speed of the screw-type chopper was 250 rpm, and the hole size of the porous plate was 10 mm.

(Drying)

1,000 g of the pulverized polymer was input to a ventilated belt-type dryer including a porous plate capable of vertically transferring air flow. 180° C. hot air was flowed from the bottom to the top for 15 minutes so that the moisture content of the dried product became approximately 2%, and then was flowed from the top to the bottom for another 15 minutes to uniformly dry the polymer, thereby preparing a dried base resin powder.

(Pulverization/Classification)

The dried base resin powder was ground with a grinder (GRAN-U-LIZERM, MPE) and then classified through a standard mesh sieve of ASTM standards to obtain a super absorbent polymer powder having a size of 150 to 850 μm.

(Surface Crosslinking Step)

A super absorbent polymer of Comparative Example 4 was prepared by performing the surface crosslinking step in the same manner as in Example 1 using the surface crosslinking agent aqueous solution of Example 1.

TABLE 1

|  | A | B | C | D | E | F | G |
|---|---|---|---|---|---|---|---|
| Example 1 | 4 | 6 | 0.08 | 0.1 | 0.2 | — | 0.1 |
| Example 2 | 4 | 6 | 0.08 | 0.1 | — | 0.1 | 0.15 |
| Example 3 | 4 | 6 | 0.1 | 0.1 | — | 0.07 | 0.1 |
| Example 4 | 5 | 6 | 0.08 | 0.1 | 0.2 | 0.03 | 0.25 |
| Comparative Example 1 | 5 | 6 | 0.1 | 0.1 | 0.4 | 0.03 | 0.1 |
| Comparative Example 2 | 5 | 6 | 0.1 | 0.1 | 0.1 | 0.2 | 0.05 |
| Comparative Example 3 | 6 | 6 | 0.1 | 0.1 | — | — | 0.25 |
| Comparative Example 4 | 4 | 6 | 0.08 | 0.1 | 0.2 | — | 0.1 |

The materials A to G in Table 1 above are as follows, and in Table 1 above, '-' means a component not included in the surface crosslinking agent aqueous solution, and the units of each number are g. That is, Table 1 shows the amount of material used per 100 g of the base resin powder.

A: Water
B: Methanol
C: Ethylene glycol diglycidyl ether
D: Propylene glycol
E: Aluminum sulfate
F: Sucrose stearate
G: Silica <Experimental Example 1>—Time-Domain Nuclear Magnetic Resonance Spectroscopy (TD-NMR) Analysis The T2 relaxation time of the super absorbent polymer of Example 1 was obtained according to steps 1 to 4 below.

Step 1) Drying (Pretreatment) of Super Absorbent Polymer

The super absorbent polymer of Example 1 was dried at about 100° C. for about 12 hours.

Step 2) Sealing (Sampling) of Dried Super Absorbent Polymer

1. About 500 mg of the dried super absorbent polymer of Example 1 was input to a 10 mm NMR tube.
2. The tube was sealed with Parafilm and sampled for TD-NMR analysis.

Step 3) TD-NMR Analysis

1. The tube accommodating the super absorbent polymer of Example 1 was stabilized at about 40° C. for about 1 hour.
2. After stabilization, TD-NMR analysis (analysis device: TD-NMR analysis equipment: Bruker minispec mq20) was performed on the super absorbent polymer of Example 1 under the following measurement conditions, and the analysis results were derived in which the x-axis represents echo time and the y-axis represents signal intensity.

<Measurement Conditions>

1) Temperature: 40° C.
2) Nuclide: $^1H$
3) Method: Hahn spin-Echo
4) Delay time: 30 sec
5) Number of scans: 4
6) Receiver gain: Use automatic values measured by the device for each sample
7) First pulse duration: 0.01 ms
8) Final pulse duration: 0.15 ms
9) Number of data points for fitting: 20
10) Time for decay curve display: 3 sec Step 4) Exponential Fitting The analysis results measured in step 3 refer to the signal intensity that appears as a result of observing free induction decay (FID), which appears as the decay of the 1H signal through TD-NMR analysis. The signal strength is observed according to the echo time.

Using the signal intensity and echo time, which are the experimental parameters of the analysis results, a T2 relaxation time (t) was derived by exponential fitting through regression analysis using the following Equation 1. This process is defined as obtaining the T2 relaxation time by exponential fitting.

That is, the T2 relaxation time was obtained by exponential fitting using the following Equation 1. The results are shown in Table 2 below.

$$y = y0 + A \times e^{-\left(\frac{x}{t}\right)} \quad \text{[Equation 1]}$$

In Equation 1, y represents a signal intensity obtained through TD-NMR analysis, x represents an echo time determined from specified experimental parameters: first duration; last duration; and a data point, t represents a T2 relaxation time derived by exponential fitting, A represents a value derived by exponential fitting, and y0 represents an offset constant derived through regression analysis.

For example, in order to perform regression analysis on the super absorbent polymer of Example 1, the TD-NMR measurement data of the super absorbent polymer of Example 1 was applied to Equation 1 using the basic s/w provided by Bruker TD-NMR minispec mq20, and fitting was performed using Origin s/w to derive y0, A, and t of Example 1.

The results were as shown in Table A below.

TABLE A

| A | 237.35122 ± 20.17102 |
|---|---|
| y0 | 9.6023 ± 0.50908 |
| t | 0.01923 ± 9.59411E−4 |

TABLE A-continued

| | |
|---|---|
| Reduced Chi-Sqr | 2.38669 |
| R-Square (COD) | 0.99263 |
| Adj. R-Square | 0.99176 |

As can be seen in Table A, y0, A, and t are derived by considering an error range. Reflecting the conservative result interpretation and statistical viewpoints, the minimum value of t, $1.83 \times 10^{-5}$ seconds (s), was defined as the T2 relaxation time, and the T2 relaxation time of Example 1 was obtained.

In addition, the T2 relaxation time (t) was calculated for Examples 2 to 4 and Comparative Examples 1 to 4 in the same manner as for Example 1. The results are also shown in Table 2 below.

TABLE 2

| | T2 relaxation time ($\times 10^{-5}$ s) |
|---|---|
| Example 1 | 1.83 |
| Example 2 | 1.70 |
| Example 3 | 1.82 |
| Example 4 | 1.77 |
| Comparative Example 1 | 1.89 |
| Comparative Example 2 | 1.90 |
| Comparative Example 3 | 2.05 |
| Comparative Example 4 | 2.20 |

<Experimental Example 2> Measurement of Convexity and CE Diameter

In addition, the convexity and CE diameter of the super absorbent polymer particles manufactured in the examples and comparative examples were measured using the following methods, and are shown in Table 3 below.

Unless otherwise specified, all of the following physical property evaluations were performed under constant temperature and humidity (23±1° C., relative humidity 50±10%), and saline or brine refers to a 0.9 wt % sodium chloride (NaCl) aqueous solution.

After the sample to be measured was left under constant temperature and humidity conditions for 24 hours, each physical property was evaluated.

For the super absorbent polymers of the examples and comparative examples, the convexity and CE diameter were measured using Morphologi 4 from Malvern Panalytical by the following method.

1) Sample preparation: 1 g of a particle sample of the super absorbent polymer to be measured was prepared. At this time, 1 g of a sample was prepared by classifying the super absorbent polymer using a particle classifier from Retsch at a 1.0 amplitude for 10 minutes to separate individual particles with a particle diameter of 300 μm to 600 μm without damaging the particles. The setting values of the sample dispersion unit at this time are as shown in FIG. 1.
2) Image acquisition: After setting the prepared sample on the stage inside the equipment, images of individual particles were obtained by scanning at 2.5× magnification. At this time, the illumination setting value and the optics selection setting value were as shown in FIGS. 2 and 3, respectively.
3) Image processing: For the acquired images, an image obtained by capturing, as a 2D image, a 3D image of each particle, and parameter values such as CE diameter, shortest diameter, longest diameter, actual particle circumference, and convex hull perimeter were measured. At this time, the scan area setting value was as shown in FIG. 4, and measured without setting the filtering value for the particle.

Among these, the average convexity value and CE diameter calculated by Equation 2 are shown in Table 3 below.

TABLE 3

| | Average convexity | Average CE diameter (μm) |
|---|---|---|
| Example 1 | 0.87 | 245 |
| Example 2 | 0.91 | 301 |
| Example 3 | 0.88 | 327 |
| Example 4 | 0.92 | 303 |
| Comparative Example 1 | 0.88 | 284 |
| Comparative Example 2 | 0.87 | 245 |
| Comparative Example 3 | 0.94 | 325 |
| Comparative Example 4 | 0.95 | 450 |

<Experimental Example 3> Physical Property Evaluation

In addition, the physical properties of the super absorbent polymers prepared in the examples and comparative examples were evaluated using the following methods and are shown in Tables 4 to 6 below.

Unless otherwise specified, all of the following physical property evaluations were performed under constant temperature and humidity (23±1° C., relative humidity 50±10%), and saline or brine refers to a 0.9 wt % sodium chloride (NaCl) aqueous solution.

After the sample to be measured was left under constant temperature and humidity conditions for 24 hours, each physical property was evaluated.

(1) Gel Strength Measurement

The gel strength of the super absorbent polymers prepared in the examples and comparative examples was measured by the following method.

Saline with 0.005% ascorbic acid (ACS) was prepared using saline and ascorbic acid (ACS). Subsequently, 0.005% ASC saline and about 2.5 g (2.5±0.01 g) of the super absorbent polymer were input to a 100 ml beaker and mixed, the beaker was sealed with a transparent wrap and then input to an oven, and the super absorbent polymer was allowed to swell at a temperature of 40° C. for 24 hours. Thereafter, the transparent wrap was removed from the beaker taken out of the oven, then the beaker was left at room temperature for 30 minutes, and the gel strength of the super absorbent polymer was measured using a tensile compression tester (manufacturer: Nidec-Shimpo).

The results are shown in Table 4 below.

(2) Centrifuge Retention Capacity (CRC, g/g)

The centrifuge retention capacity of the super absorbent polymers of the examples and comparative examples by the absorption rate under no-load was measured according to the European Disposables and Nonwovens Association (EDANA) standard EDANA WSP 241.3.

Measurements were performed at a temperature of 23±2° C. and a relative humidity of 45±15% as described in EDANA WSP 241.0.

Specifically, the super absorbent polymer $W_0$ (g) (about 0.2 g) obtained through each of the examples and comparative examples was uniformly placed in a nonwoven bag, and the bag was sealed and then immersed in saline (0.9 wt %) at room temperature. After 30 minutes, water was removed from the bag using a centrifuge at 250 G for 3 minutes, and the mass $W_2$ (g) of the bag was measured. In addition, the same operation was performed without using the polymer, and the mass $W_1$ (g) at that time was measured.

Using each mass obtained, CRC (g/g) was calculated according to the following Mathematical Formula 1.

$$\text{CRC (g/g)} = \{[W_2\text{ (g)} - W_1\text{ (g)}]/W_0\text{ (g)}\} - 1 \quad \text{[Mathematical Formula 1]}$$

The measurement was repeated five times, and the average and standard deviation were calculated.

The results are shown in Table 4 below.

(3) Absorbency Under Pressure (AUP, g/g)

The absorbency under pressure of the super absorbent polymers of the examples and comparative examples at 0.3 psi was measured according to EDANA method WSP 242.3.

Measurements were performed at a temperature of 23±2° C. and a relative humidity of 45±15% as described in EDANA WSP 242.0.

Specifically, a 400 mesh stainless steel wire mesh was installed on the bottom of a plastic cylinder with an inner diameter of 25 mm. Under the conditions of room temperature and 50% humidity, $W_0$ (g) (0.9 g) of the super absorbent polymer was uniformly sprayed on the wire mesh, and a piston capable of uniformly applying a load of 0.3 psi was placed thereon with an outer diameter slightly smaller than 25 mm so that there were no gap with the inner wall of the cylinder and no obstructed up-and-down movement. At this time, the weight $W_3$ (g) of the device was measured.

A glass filter with a diameter of 90 mm and a thickness of 5 mm was placed on the inside of a Petri dish with a diameter of 150 mm, and saline composed of 0.9 wt % sodium chloride was poured so that it was at the same level as the upper surface of the glass filter. A sheet of filter paper with a diameter of 90 mm was placed thereon. The measuring device was placed on the filter paper and the liquid was allowed to be absorbed under a load for 1 hour. After 1 hour, the measuring device was lifted and its weight $W_4$ (g) was measured.

Using each mass obtained, the absorbency under pressure (g/g) was calculated according to the following Mathematical Formula 2.

$$\text{AUP (g/g)} = [W_4\text{ (g)} - W_3\text{ (g)}]/W_0\text{ (g)} \quad \text{[Mathematical Formula 2]}$$

The measurement was repeated five times, and the average and standard deviation were calculated.

The results are shown in Table 4 below.

(4) Effective Absorption Capacity (EFFC)

The measured retention capacity and absorbency under pressure were applied to Equation 3 below to calculate the effective absorption capacity (EFFC).

$$\text{EFFC} = (\text{CRC} + \text{AUP})/2 \quad \text{[Equation 3]}$$

In Equation 3,

CRC represents a centrifuge retention capacity (units: g/g) as measured according to EDANA method WSP 241.3, and AUP represents an absorbency under pressure (units: g/g) as measured under 0.3 psi according to EDANA method WSP 242.3.

The results are shown in Table 4 below.

(5) Absorption Rate (Vortex Time)

The absorption rate (vortex time) of the super absorbent polymer of the examples and comparative examples was measured by the following method.

1. First, 50 mL of 0.9% saline was input to a 100 mL beaker with a flat bottom using a 100 mL mass cylinder.
2. Next, the beaker was placed in the center of the magnetic stirrer, and a circular magnetic bar (diameter 30 mm) was placed inside the beaker.
3. Thereafter, the stirrer was operated so that the magnetic bar stirred at 600 rpm, and the lowest part of the vortex created by the stirring was made to touch the top of the magnetic bar.
4. After confirming that the temperature of the saline in the beaker was 24.0° C., 2±0.01 g of the super absorbent polymer sample was input while simultaneously operating a stopwatch, and the time until the vortex disappeared and the liquid surface became completely horizontal was measured in seconds, which was taken as the absorption rate.

The results are shown in Table 4 below.

(6) Free Swelling Capacity ($FSC_{110}$) and 1-Minute Absorption Capacity ($WFA_{110}$) in Water Having Electrical Conductivity Value of 110 μS/Cm For the super absorbent polymer of Example 1, the free swelling capacity ($FSC_{110}$) and 1-minute absorption capacity ($WFA_{110}$) in water having an electrical conductivity value of 110 μS/cm at 24° C. were measured using the following method. The specific measurement process was as follows.

1. A 18 cm×28 cm broth tea bag was input into each of eight 2 L beakers.
2. After pouring 1 L of water having an electrical conductivity value of 110 μS/cm at 24° C. into the beaker, the tea bag was left in a submerged state in each beaker for 10 sec/20 sec/30 sec/60 sec/120 sec/300 sec/600 sec/1800 sec.
3. After 10 sec/20 sec/30 sec/60 sec/120 sec/300 sec/600 sec/1800 sec, the tea bag was removed from each beaker, and the weight ($W_a$) of the broth tea bag was recorded when water no longer dripped from the broth tea bag. Among these, the weight measured when no water dripped from the broth tea bag taken out after 60 seconds (1 minute) was defined as $W_1$ (Blank value).
4. A 18 cm×28 cm broth tea bag was input into each of other eight 2 L beakers.
5. 1 g of the super absorbent polymer (SAP) of Example 1 was accurately weighed and evenly sprayed on the bottom of each broth tea bag.
6. After pouring 1 L of water having an electrical conductivity value of 110 μS/cm at 24° C. into the each beaker, the tea bag was left in a submerged state in each beaker for 10 sec/20 sec/30 sec/60 sec/120 sec/300 sec/600 sec/1800 sec.
7. After 10 sec/20 sec/30 sec/60 sec/120 sec/300 sec/600 sec/1800 sec, the broth tea bag sprayed with the super absorbent polymer was taken out of each beaker, and when the water having an electrical conductivity value of 110 μS/cm no longer dripped, the weight ($W_s$) of the broth tea bag sprayed with the super absorbent polymer was recorded. Among these, the weight measured when no water dripped from the broth tea bag sprayed with the super absorbent polymer taken out after 60 seconds (1 minute) was defined as $W_2$.
8. The weight of the broth tea bag in each beaker was applied to the following Mathematical Equation 3 to calculate the free swelling capacity ($FSC_{110}$) in water having an electrical conductivity value of 110 μS/cm at 24° C.

$$FSC_{110}\text{ (g/g)} = W_a - W_s \quad \text{[Mathematical Formula 3]}$$

9. The 1-minute absorption capacity ($WFA_{110}$) in water having an electrical conductivity value of 110 μS/cm was calculated using the following Mathematical Formula 4. That is, the 1-minute absorption capacity ($WFA_{110}$) in water having an electrical conductivity of 110 µS/cm represents the free swelling capacity (FSC$_{110}$) in water having an electrical conductivity of 110 µS/cm at 24° C., which is calculated using a broth tea bag input to a beaker for 1 minute.

$$WFA_{110} (g/g) = W_2 - W_1 \quad \text{[Mathematical Formula 4]}$$

In addition, for the super absorbent polymers of Examples 2 to 4 and Comparative Examples 1 to 4, the same experiments as for the super absorbent polymer of Example 1 were additionally performed.

The results are shown in Tables 4 and 5 below.

(6) Measurement of Liquid Permeability of Super Absorbent Polymer

At room temperature (23° C. to 25° C.), 0.2 g of the super absorbent polymers of the examples and comparative examples were input into a cylinder with an inner diameter of 20 mm, and saline (0.9 wt % sodium chloride aqueous solution) was poured so that the super absorbent polymer was completely submerged, and the super absorbent polymer was allowed to swell for 30 minutes. Thereafter, a pressure of 0.3 psi was applied using a piston with an outer diameter slightly smaller than 20 mm.

The time (T1) taken for 20 mL of saline to pass through the swollen super absorbent polymer was measured by measuring the decrease in height of the saline filled in the cylinder under a pressure of 0.3 psi in seconds.

Subsequently, the liquid permeability of the super absorbent polymer was calculated according to Equation 4 below.

$$Perm = [20 \text{ mL}/T1 \text{ (sec)}] \times 60 \text{ sec} \quad \text{[Equation 4]}$$

In Equation 4,

Perm represents liquid permeability, and

T1 represents the time (seconds) taken for 20 mL of saline to pass through the swollen super absorbent polymer under a pressure of 0.3 psi after placing 0.2 g of a super absorbent polymer in a cylinder, pouring saline (0.9 wt % sodium chloride aqueous solution) so that the super absorbent polymer is completely submerged, and allowing the super absorbent polymer to swell for 30 minutes.

The results are shown in Table 6 below.

TABLE 4

| | Gel strength (N) | CRC (g/g) | 0.3AUP (g/g) | EFFC | Vortex time (sec) | WFA$_{110}$ (g/g) |
|---|---|---|---|---|---|---|
| Example 1 | 0.84 | 37.4 | 30.9 | 34.2 | 15 | 216 |
| Example 2 | 0.91 | 34.2 | 34 | 33.4 | 37 | 190 |
| Example 3 | 0.92 | 31.5 | 28.8 | 30.2 | 29 | 138 |
| Example 4 | 1.37 | 30.8 | 29.8 | 30.3 | 25 | 141 |
| Comparative Example 1 | 0.76 | 38.1 | 26.5 | 32.9 | 41 | 86 |
| Comparative Example 2 | 0.61 | 36.4 | 26.1 | 32.3 | 43 | 122 |
| Comparative Example 3 | 0.72 | 39.5 | 21.5 | 30.5 | 46 | 123 |
| Comparative Example 4 | 0.67 | 40 | 26.5 | 33.5 | 38 | 90 |

TABLE 5

Free swelling capacity (FSC$_{110}$) over time in water with electrical conductivity of 110 µS/cm at 24° C., (g/g)

| | Swelling time, t (s) | | | | | | | |
|---|---|---|---|---|---|---|---|---|
| | 10 | 20 | 30 | 60 | 120 | 300 | 600 | 1800 |
| Example 1 | 54 | 89 | 124 | 216 | 268 | 342 | 366 | 388 |
| Example 2 | 44 | 80 | 109 | 190 | 256 | 309 | 326 | 333 |
| Example 3 | 36 | 69 | 104 | 138 | 305 | 320 | 323 | 389 |
| Example 4 | 37 | 70 | 110 | 141 | 279 | 311 | 319 | 328 |
| Comparative Example 1 | 17 | 32 | 47 | 86 | 206 | 290 | 315 | 310 |
| Comparative Example 2 | 29 | 51 | 74 | 122 | 168 | 289 | 352 | 374 |
| Comparative Example 3 | 37 | 51 | 70 | 123 | 188 | 266 | 317 | 370 |
| Comparative Example 4 | 25 | 35 | 56 | 90 | 189 | 260 | 308 | 337 |

TABLE 6

| | T1 (sec) | Liquid permeability of Equation 4 (mL) |
|---|---|---|
| Example 1 | 10 | 120 |
| Example 2 | 7 | 171 |
| Example 3 | 11 | 109 |
| Example 4 | 14 | 86 |
| Comparative Example 1 | 19 | 63 |
| Comparative Example 2 | 20 | 60 |
| Comparative Example 3 | 24 | 50 |
| Comparative Example 4 | 23 | 52 |

As can be seen in Tables 3 to 6 above, in the case of the super absorbent polymers of the examples in which the TD-NMR of the super absorbent polymer is measured and the T2 relaxation time derived by exponential fitting of the measurement results through regression analysis using Equation 1 satisfies the range of the present disclosure, it was confirmed that they can exhibit an excellent physical property balance of absorption performance and liquid permeability.

The super absorbent polymer of the present disclosure has excellent absorbency under pressure and liquid permeability, and when applied to a product, can quickly absorb body fluid and retain a large amount of body fluid without leaking to the outside. That is, the super absorbent polymer of the present disclosure has an excellent balance between physical properties.

What is claimed is:

1. A polyacrylic acid (salt)-based super absorbent polymer,
wherein a T2 relaxation time is $1.85 \times 10^{-5}$ seconds or less, as derived by exponential fitting of the TD-NMR measurement results of the super absorbent polymer through regression analysis using the following Equation 1:

$$y = y0 + A \times e^{-\left(\frac{x}{t}\right)} \quad \text{[Equation 1]}$$

wherein, y represents a signal intensity obtained through TD-NMR analysis, x represents an echo time, t represents a T2 relaxation time derived by exponential fitting, A represents a signal intensity value derived by exponential fitting, and y0 represents an offset constant derived through regression analysis.

2. The super absorbent polymer of claim 1, wherein the T2 relaxation time is $1.60 \times 10^{-5}$ seconds or more.

3. The super absorbent polymer of claim 1, wherein the super absorbent polymer has an average convexity value of 0.94 or less for all particles of the super absorbent polymer, as calculated using the following Equation 2:

$$M_c = L_s/L \qquad \text{[Equation 2]}$$

wherein, $M_c$ represents convexity, $L_s$ represents a length of an elastic band assuming that an image obtained by capturing, as a 2D image, a 3D image of the 3D particle to be measured is surrounded by an imaginary elastic band that stretches around the contour, and L represents an actual circumferential length of an image obtained by capturing, as a 2D image, a 3D image of the 3D particle to be measured.

4. The super absorbent polymer of claim 1, wherein the super absorbent polymer has an extractable component content of 10 wt % or less based on a total weight of the super absorbent polymer, as measured after free swelling in water having an electrical conductivity of 100 to 130 μS/cm for 30 minutes.

5. The super absorbent polymer of claim 1, wherein the super absorbent polymer has an extractable component content of 17 wt % or less based on a total weight of the super absorbent polymer, as measured after free swelling in water having an electrical conductivity of 100 to 130 μS/cm for 3 hours.

6. The super absorbent polymer of claim 1, wherein the super absorbent polymer has an absorbency under pressure (AUP) of 28 g/g or more, as measured under 0.3 psi according to the EDANA method WSP 242.3.

7. The super absorbent polymer of claim 1, wherein the super absorbent polymer has a centrifuge retention capacity (CRC) of 30.8 g/g or more, as measured according to EDANA method WSP 241.3.

8. The super absorbent polymer of claim 1, wherein the super absorbent polymer has an effective absorption capacity (EFFC) of 30 g/g or more, as calculated by the following Equation 3:

$$EFFC = (CRC + AUP)/2 \qquad \text{[Equation 3]}$$

wherein,

CRC represents a centrifuge retention capacity (units: g/g) as measured according to EDANA method WSP 241.3, and AUP represents an absorbency under pressure (units: g/g) as measured under 0.3 psi according to EDANA method WSP 242.3.

9. The super absorbent polymer of claim 1, wherein the super absorbent polymer has an absorption rate (vortex time) of 40 seconds or less, as measured by a vortex measurement method at 24.0° C.

10. The super absorbent polymer of claim 1, wherein when the super absorbent polymer is swollen in water having an electrical conductivity value of 100 to 130 μS/cm for 1 minute, a maximum capacity of water that the super absorbent polymer is able to hold (free swelling capacity) is 138 g/g or more.

11. The super absorbent polymer of claim 1, wherein the super absorbent polymer has a liquid permeability of 65 ml or more, as calculated by the following Equation 4:

$$Perm = [20mL/T1(\text{sec})] \times 60 \text{ sec} \qquad \text{[Equation 4]}$$

wherein,

Perm represents liquid permeability, and

T1 represents the time (seconds) taken for 20 mL of saline to pass through a swollen super absorbent polymer under a pressure of 0.3 psi after placing 0.2 g of a super absorbent polymer in a cylinder, the swollen super absorbent polymer is prepared by pouring saline (0.9 wt % sodium chloride aqueous solution) so that the super absorbent polymer is completely submerged, and allowing the super absorbent polymer to swell for 30 minutes.

* * * * *